(12) United States Patent
Makar et al.

(10) Patent No.: US 10,593,097 B2
(45) Date of Patent: Mar. 17, 2020

(54) DISTRIBUTED GRAPHICS PROCESSING

(71) Applicant: QUALCOMM Incorporated, San Diego, CA (US)

(72) Inventors: Mina Makar, San Diego, CA (US); Dieter Schmalsteig, Graz (AT); Ajit Venkat Rao, Bangalore (IN); Serafin Diaz Spindola, San Diego, CA (US); Bojan Vrcelj, San Diego, CA (US)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 15/974,573

(22) Filed: May 8, 2018

(65) Prior Publication Data
US 2019/0347845 A1 Nov. 14, 2019

(51) Int. Cl.
G06T 15/04 (2011.01)
G06T 1/20 (2006.01)
G06T 15/80 (2011.01)
G06T 9/00 (2006.01)
G06F 9/50 (2006.01)

(52) U.S. Cl.
CPC ............ *G06T 15/04* (2013.01); *G06F 9/5027* (2013.01); *G06T 1/20* (2013.01); *G06T 15/80* (2013.01)

(58) Field of Classification Search
None
See application file for complete search history.

(56) References Cited

U.S. PATENT DOCUMENTS

| 9,704,270 B1* | 7/2017 | Main ........................ G06T 7/11 |
| 2007/0019740 A1 | 1/2007 | Budagavi |
| 2008/0232700 A1 | 9/2008 | Gering et al. |
| 2009/0196517 A1 | 8/2009 | Divorra et al. |
| 2011/0235928 A1 | 9/2011 | Stroem et al. |
| 2013/0039423 A1 | 2/2013 | Helle et al. |
| 2017/0161940 A1 | 6/2017 | Liktor et al. |
| 2017/0227765 A1 | 8/2017 | Mammou et al. |

OTHER PUBLICATIONS

Nishino K., et al., "Eigen-Texture Method : Appearance Compression based on 3D Model", IEEE Computer Society Conference on Computer Vision and Pattern Recognition, 1999, 8 Pages.
Chen C-H., et al., "A JPEG-like Texture Compression with Adaptive Quantization for 3D Graphics Application", Visual Computer, Springer, Berlin, DE, Feb. 1, 2002, vol. 18, No. 1, XP001149442, ISSN: 0178-2789, DOI: 10.1007/S003710100130, pp. 29-40.
International Search Report and Written Opinion—PCT/US2019/030620—ISA/EPO—dated Aug. 1, 2019.

* cited by examiner

*Primary Examiner* — Nurun N Flora
(74) *Attorney, Agent, or Firm* — Arent Fox, LLP

(57) ABSTRACT

A method, an apparatus, and a computer-readable medium for wireless communication are provided. In one aspect, an example method may include determining to control a bit rate of a content encoder. The method may include generating a first number of shaded texture atlases for use in rendering a second number of frames by a second device based on the determination to control the bit rate of the content encoder. Each respective shaded texture atlas may include a respective plurality of shaded primitives. The method may include encoding, by the content encoder of the first device, a first shaded texture atlas of the first number of shaded texture atlases. The method may include transmitting, by the first device, the encoded first shaded texture atlas to the second device.

20 Claims, 15 Drawing Sheets 208-1

| DATA STRUCTURE FOR FRAME 1 | | | | |
|---|---|---|---|---|
| FRAME IDENTIFIER | SHADED TEXTURE ATLAS IDENTIFIER | PRIMITIVE IDENTIFIER | PRIMITIVE POSITION IN 3D-MESH INFORMATION | PRIMITIVE POSITION IN SHADED TEXTURE ATLAS INFORMATION |
| 1 | 1 | 1 | 3D COORDINATES FOR VERTICES OF PRIMITIVE 1 | 2D COORDINATES FOR VERTICES OF PRIMITIVE 1 |
| | | 2 | 3D COORDINATES FOR VERTICES OF PRIMITIVE 2 | 2D COORDINATES FOR VERTICES OF PRIMITIVE 2 |
| | | ... | ... | ... |
| | | N | 3D COORDINATES FOR VERTICES OF PRIMITIVE N | 2D COORDINATES FOR VERTICES OF PRIMITIVE N |

| DATA STRUCTURE FOR FRAME 2 | | | | |
|---|---|---|---|---|
| FRAME IDENTIFIER | SHADED TEXTURE ATLAS IDENTIFIER | PRIMITIVE IDENTIFIER | PRIMITIVE POSITION IN 3D-MESH INFORMATION | PRIMITIVE POSITION IN SHADED TEXTURE ATLAS INFORMATION |
| 2 | 2 | 1 | 3D COORDINATES FOR VERTICES OF PRIMITIVE 1 | 2D COORDINATES FOR VERTICES OF PRIMITIVE 1 |
| | | 2 | 3D COORDINATES FOR VERTICES OF PRIMITIVE 2 | 2D COORDINATES FOR VERTICES OF PRIMITIVE 2 |
| | | ... | ... | ... |
| | | N | 3D COORDINATES FOR VERTICES OF PRIMITIVE N | 2D COORDINATES FOR VERTICES OF PRIMITIVE N |

| DATA STRUCTURE FOR FRAME 3 | | | | |
|---|---|---|---|---|
| FRAME IDENTIFIER | SHADED TEXTURE ATLAS IDENTIFIER | PRIMITIVE IDENTIFIER | PRIMITIVE POSITION IN 3D-MESH INFORMATION | PRIMITIVE POSITION IN SHADED TEXTURE ATLAS INFORMATION |
| 3 | 2 | 1 | 3D COORDINATES FOR VERTICES OF PRIMITIVE 1 | 2D COORDINATES FOR VERTICES OF PRIMITIVE 1 |
| | | 2 | 3D COORDINATES FOR VERTICES OF PRIMITIVE 2 | 2D COORDINATES FOR VERTICES OF PRIMITIVE 2 |
| | | ... | ... | ... |
| | | N | 3D COORDINATES FOR VERTICES OF PRIMITIVE N | 2D COORDINATES FOR VERTICES OF PRIMITIVE N |

| DATA STRUCTURE FOR FRAME M | | | | |
|---|---|---|---|---|
| FRAME IDENTIFIER | SHADED TEXTURE ATLAS IDENTIFIER | PRIMITIVE IDENTIFIER | PRIMITIVE POSITION IN 3D-MESH INFORMATION | PRIMITIVE POSITION IN SHADED TEXTURE ATLAS INFORMATION |
| M | M | 1 | 3D COORDINATES FOR VERTICES OF PRIMITIVE 1 | 2D COORDINATES FOR VERTICES OF PRIMITIVE 1 |
| | | 2 | 3D COORDINATES FOR VERTICES OF PRIMITIVE 2 | 2D COORDINATES FOR VERTICES OF PRIMITIVE 2 |
| | | ... | ... | ... |
| | | N | 3D COORDINATES FOR VERTICES OF PRIMITIVE N | 2D COORDINATES FOR VERTICES OF PRIMITIVE N |

FIG. 3D

400
| BLOCK 1 | BLOCK 2 | BLOCK 3 | BLOCK 4 (LOD 1) |
|---|---|---|---|
| BLOCK 5 | BLOCK 6 (LOD 2) | BLOCK 7 | BLOCK 8 |
| BLOCK 9 | BLOCK 10 | BLOCK 11 | BLOCK 12 |
| BLOCK 13 | BLOCK 14 | BLOCK 15 | BLOCK 16 |
FIG. 4A
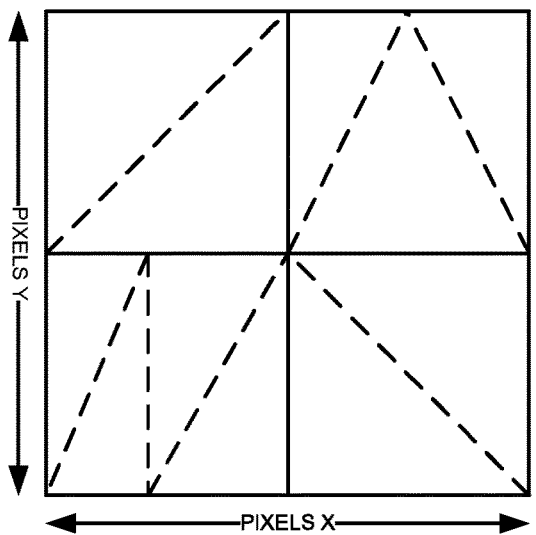
FIG. 4B
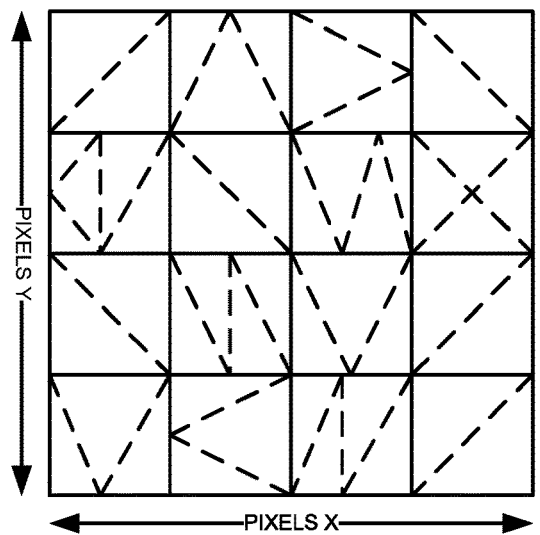
FIG. 4C

402
| BLOCK 1 | BLOCK 2 | BLOCK 3 | BLOCK 4 |
| BLOCK 5 | BLOCK 6 | BLOCK 7 | BLOCK 8 |
| BLOCK 9 | BLOCK 10 | BLOCK 11 | BLOCK 12 |
| BLOCK 13 (LOD 1) | BLOCK 14 (LOD 1) | BLOCK 15 (LOD 1) | BLOCK 16 (LOD 1) |
FIG. 4D
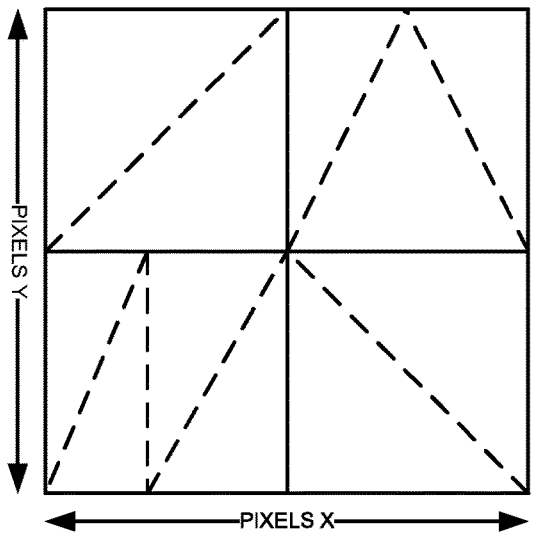
FIG. 4E
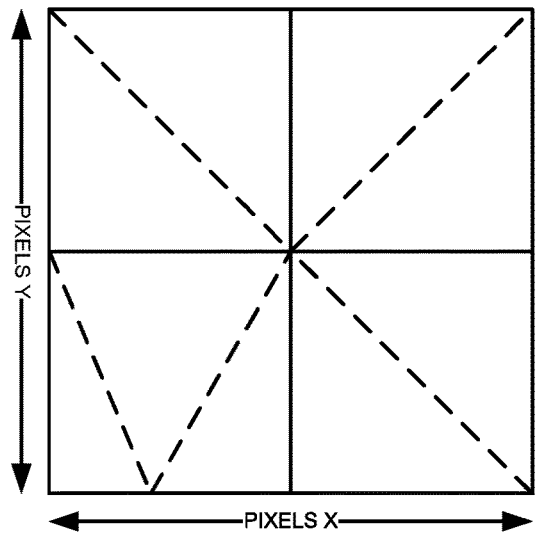
FIG. 4F

404

| BLOCK 1 | BLOCK 2 | BLOCK 3 | BLOCK 4 |
| --- | --- | --- | --- |
| BLOCK 5 | BLOCK 6 | BLOCK 7 | BLOCK 8 |
| BLOCK 9 | BLOCK 10 | BLOCK 11 | BLOCK 12 |
| BLOCK 13 | BLOCK 14 | BLOCK 15 | BLOCK 16 (LOD 2) |

EXAMPLE OF BLOCK 16: LOD 2

DISTRIBUTED GRAPHICS PROCESSING

FIELD

The present disclosure relates generally to communication systems; and, more particularly, to one or more techniques for graphics processing in communication systems.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes a plurality of processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a graphics processing unit (GPU).

Typically, a GPU of a device is configured to perform every process in a graphics processing pipeline. However, with the advent of wireless communication and the streaming of content (e.g., game content or any other content that is rendered using a GPU), there has developed a need for distributed graphics processing. For example, there has developed a need to offload processing performed by a GPU of a first device (e.g., a client device, such as a game console, a virtual reality device, or any other device) to a second device (e.g., a server, such as a server hosting a mobile game).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a first apparatus are provided. The first apparatus may include a memory configured to store data, a first processing unit communicatively coupled with the memory, and a content encoder communicatively coupled with the memory and with the first processing unit. The first processing unit may be configured to determine to control a bit rate of the content encoder. The first processing unit may be configured to generate a first number of shaded texture atlases for use in rendering a second number of frames by a second apparatus based on the determination to control the bit rate of the content encoder. Each respective shaded texture atlas may include a respective plurality of shaded primitives. The content encoder may be configured to encode a first shaded texture atlas of the first number of shaded texture atlases. The first apparatus may be configured to transmit the encoded first shaded texture atlas to the second apparatus.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 3A-3D illustrate examples of position information in accordance with the techniques of this disclosure.

FIG. 4A illustrates an example shaded texture atlas in accordance with the techniques of this disclosure.

FIG. 4B illustrates an example of a block with a plurality of sub-blocks in accordance with the techniques described herein.

FIG. 4C illustrates an example of a block with a plurality of sub-blocks in accordance with the techniques described herein.

FIG. 4D illustrates an example shaded texture atlas in accordance with the techniques of this disclosure.

FIG. 4E illustrates an example of a block with a plurality of sub-blocks in accordance with the techniques described herein.

FIG. 4F illustrates an example of a block with a plurality of sub-blocks in accordance with the techniques described herein.

DETAILED DESCRIPTION

Figure 1:
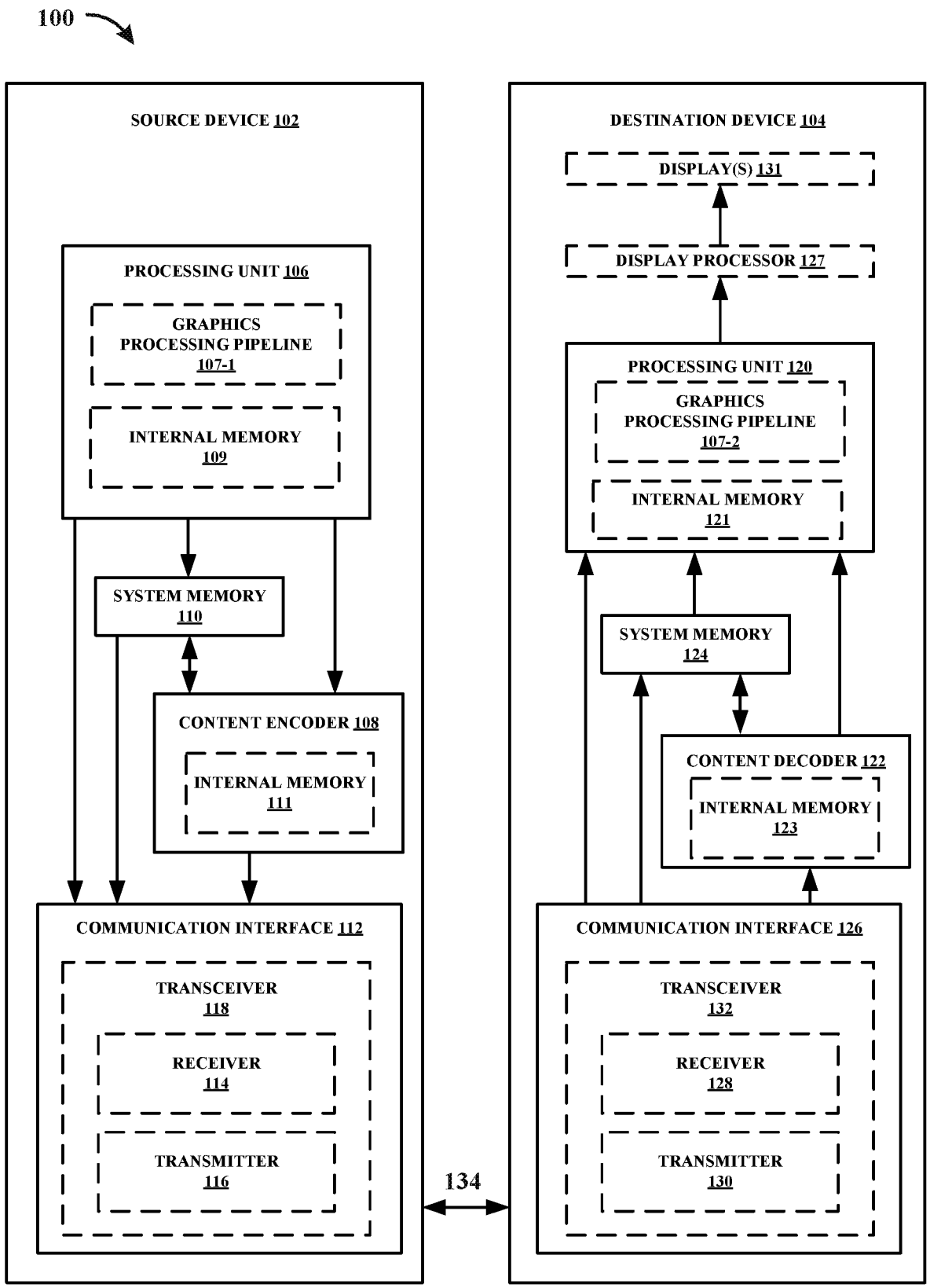
FIG. 1 is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, it is understood that the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a distributed graphics processing pipeline across multiple devices, improving the coding of graphical content, and/or reducing the load of a processing unit (i.e., any processing unit configured to perform one or more techniques described herein, such as a graphics processing unit (GPU)). For example, this disclosure describes techniques for controlling a bit rate of a content coder by performing one or more techniques described herein by a processing unit, such as controlling adaptive shading frame rate and/or controlling mip-map biasing. In some examples, a processing unit may be configured to perform adaptive shading (i.e., perform adaptive shading frame rate techniques described herein), mip-map biasing, and/or output one or more instructions to the content coder to control the bit rate of the content coder. Performing adaptive shading or mip-map biasing may affect what graphical content and/or how much graphical content the processing unit provides (i.e., outputs) to the content coder or outputs to memory from which the content coder may be configured to access (e.g., read). The one or more instructions provided by the processing unit to the content coder may control (e.g., modify or adjust) one or more coding parameters (e.g., a Quantization Parameter (QP)) of the content coder. The bit rate of the content coder may refer to the output of the content coder, such as a bitstream. In some examples, the bit rate of the content coder may be in accordance with or otherwise comply with a content coding standard, such as a video coding standard (e.g., H.264, H.265, or any other video coding standard), a display stream compression standard, or an image compression standard. Other possible example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "video," "graphical content," "image," and vice versa. This is true regardless of whether the terms are being used as an adjective, noun, or other part of speech. For example, reference to a "content coder" may include reference to a "video coder," "graphical content coder," or "image coder,"; and reference to a "video coder," "graphical content coder," or "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As referenced herein, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1 is a block diagram that illustrates an example content generation and coding system 100 configured to implement one or more techniques of this disclosure. The content generation and coding system 100 includes a source device 102 and a destination device 104. In accordance with the techniques described herein, the source device 102 may be configured to encode, using the content encoder 108, graphical content generated by the processing unit 106 prior to transmission to the destination device 104. The content encoder 108 may be configured to output a bitstream having a bit rate. The processing unit 106 may be configured to control and/or influence the bit rate of the content encoder 108 based on how the processing unit 106 generates graphical content.

The source device 102 may include one or more components (or circuits) for performing various functions described herein. The destination device 104 may include one or more components (or circuits) for performing various functions described herein. In some examples, one or more components of the source device 102 may be components of a system-on-chip (SOC). Similarly, in some examples, one or more components of the destination device 104 may be components of an SOC.

The source device 102 may include one or more components configured to perform one or more techniques of this disclosure. In the example shown, the source device 102 may include a processing unit 106, a content encoder 108, a system memory 110, and a communication interface 112. The processing unit 106 may include an internal memory 109. The processing unit 106 may be configured to perform graphics processing, such as in a graphics processing pipeline 107-1. The content encoder 108 may include an internal memory 111.

Memory external to the processing unit 6 and the content encoder 108, such as system memory 110, may be accessible to the processing unit 6 and the content encoder 108. For example, the processing unit 6 and the content encoder 108 may be configured to read from and/or write to external memory, such as the system memory 110. The processing unit 6 and the content encoder 108 may be communicatively coupled to the system memory 110 over a bus. In some examples, the processing unit 6 and the content encoder 108 may be communicatively coupled to each other over the bus or a different connection.

The content encoder 108 may be configured to receive graphical content from any source, such as the system memory 110 and/or the processing unit 106. The system memory 110 may be configured to store graphical content generated by the processing unit 106. For example, the processing unit 106 may be configured to store graphical content in the system memory 110. The content encoder 108 may be configured to receive graphical content (e.g., from the system memory 110 and/or the processing unit 106) in the form of pixel data. Otherwise described, the content encoder 108 may be configured to receive pixel data of graphical content produced by the processing unit 106. For example, the content encoder 108 may be configured to receive a value for each component (e.g., each color component) of one or more pixels of graphical content. As an example, a pixel in the RGB color space may include a first value for the red component, a second value for the green component, and a third value for the blue component.

The internal memory 109, the system memory 110, and/or the internal memory 111 may include one or more volatile or non-volatile memories or storage devices. In some examples, internal memory 109, the system memory 110, and/or the internal memory 111 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 109, the system memory 110, and/or the internal memory 111 may be a non-transitory storage medium according to some examples. The term "non-transitory" may indicate that the storage medium is not embodied in a carrier wave or a propagated signal. However, the term "non-transitory" should not be interpreted to mean that internal memory 109, the system memory 110, and/or the internal memory 111 is non-movable or that its contents are static. As one example, the system memory 110 may be removed from the source device 102 and moved to another device. As another example, the system memory 110 may not be removable from the source device 102.

The processing unit 106 may be a central processing unit (CPU), a graphics processing unit (GPU), a general purpose GPU (GPGPU), or any other processing unit that may be configured to perform graphics processing. In some examples, the processing unit 6 may be integrated into a motherboard of the source device 102. In some examples, the processing unit 6 may be may be present on a graphics card that is installed in a port in a motherboard of the source device 102, or may be otherwise incorporated within a peripheral device configured to interoperate with the source device 102.

The processing unit 6 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 106 may store instructions for the software in a suitable, non-transitory computer-readable storage medium (e.g., internal memory 109), and may execute the instructions in hardware using one or more processors to perform the techniques of this disclosure. Any of the foregoing (including hardware, software, a combination of hardware and software, etc.) may be considered to be one or more processors.

The content encoder 108 may be any processing unit configured to perform content encoding. In some examples, the content encoder 108 may be integrated into a motherboard of the source device 102. The content encoder 108 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 108 may store instructions for the software in a suitable, non-transitory computer-readable storage medium (e.g., internal memory 111), and may execute the instructions in hardware using one or more processors to perform the techniques of this disclosure. Any of the foregoing (including hardware, software, a combination of hardware and software, etc.) may be considered to be one or more processors.

The communication interface 112 may include a receiver 114 and a transmitter 116. The receiver 114 may be configured to perform any receiving function described herein with respect to the source device 102. For example, the receiver 114 may be configured to receive information from the destination device 104, which may include a request for content. In some examples, in response to receiving the request for content, the source device 102 may be configured to perform one or more techniques described herein, such as produce or otherwise generate graphical content for delivery to the destination device 104. The transmitter 116 may be configured to perform any transmitting function described herein with respect to the source device 102. For example, the transmitter 116 may be configured to transmit encoded content to the destination device 104, such as encoded graphical content produced by the processing unit 106 and the content encoder 108 (i.e., the graphical content is produced by the processing unit 106, which the content encoder 108 receives as input to produce or otherwise generate the encoded graphical content). The receiver 114 and the transmitter 116 may be combined into a transceiver 118. In such examples, the transceiver 118 may be configured to perform any receiving function and/or transmitting function described herein with respect to the source device 102.

The destination device 104 may include one or more components configured to perform one or more techniques of this disclosure. In the example shown, the destination device 104 may include a processing unit 120, a content decoder 122, a system memory 124, a communication interface 126, and one or more displays 131. Reference to the display 131 may refer to the one or more displays 131. For example, the display 131 may include a single display or a plurality of displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 120 may include an internal memory 121. The processing unit 120 may be configured to perform graphics processing, such as in a graphics processing pipeline 107-2. The content decoder 122 may include an internal memory 123. In some examples, the destination device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display content that was generated using decoded content. For example, the display processor 127 may be configured to process one or more frames generated by the processing unit 120, where the one or more frames are generated by the processing unit 120 by using decoded content that was derived from encoded content received from the source device 102. In turn the display processor 127 may be configured to perform display processing on the one or more frames generated by the processing unit 120. The one or more displays 131 may be configured to display or otherwise present frames processed by the display processor 127. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content decoder 122, such as system memory 124, may be accessible to the processing unit 120 and the content decoder 122. For example, the processing unit 120 and the content decoder 122 may be configured to read from and/or write to external memory, such as the system memory 124. The processing unit 120 and the content decoder 122 may be communicatively coupled to the system memory 124 over a bus. In some examples, the processing unit 120 and the content decoder 122 may be communicatively coupled to each other over the bus or a different connection.

The content decoder 122 may be configured to receive graphical content from any source, such as the system memory 124 and/or the communication interface 126. The system memory 124 may be configured to store received encoded graphical content, such as encoded graphical content received from the source device 102. The content decoder 122 may be configured to receive encoded graphical content (e.g., from the system memory 124 and/or the communication interface 126) in the form of encoded pixel data. The content decoder 122 may be configured to decode encoded graphical content.

The internal memory 121, the system memory 124, and/or the internal memory 123 may include one or more volatile or non-volatile memories or storage devices. In some examples, internal memory 121, the system memory 124, and/or the internal memory 123 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 121, the system memory 124, and/or the internal memory 123 may be a non-transitory storage medium according to some examples. The term "non-transitory" may indicate that the storage medium is not embodied in a carrier wave or a propagated signal. However, the term "non-transitory" should not be interpreted to mean that internal memory 121, the system memory 124, and/or the internal memory 123 is non-movable or that its contents are static. As one example, the system memory 124 may be removed from the destination device 104 and moved to another device. As another example, the system memory 124 may not be removable from the destination device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the destination device 104. In some examples, the processing unit 120 may be may be present on a graphics card that is installed in a port in a motherboard of the destination device 104, or may be otherwise incorporated within a peripheral device configured to interoperate with the destination device 104.

The processing unit 120 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., internal memory 121), and may execute the instructions in hardware using one or more processors to perform the techniques of this disclosure. Any of the foregoing (including hardware, software, a combination of hardware and software, etc.) may be considered to be one or more processors.

The content decoder 122 may be any processing unit configured to perform content decoding. In some examples, the content decoder 122 may be integrated into a motherboard of the destination device 104. The content decoder 122 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content decoder 122 may store instructions for the software in a suitable, non-transitory computer-readable storage medium (e.g., internal memory 123), and may execute the instructions in hardware using one or more processors to perform the techniques of this disclosure. Any of the foregoing (including hardware, software, a combination of hardware and software, etc.) may be considered to be one or more processors.

The communication interface 126 may include a receiver 128 and a transmitter 130. The receiver 128 may be configured to perform any receiving function described herein with respect to the destination device 104. For example, the receiver 128 may be configured to receive information from the source device 102, which may include encoded content, such as encoded graphical content produced or otherwise generated by the processing unit 106 and the content encoder 108 of the source device 102 (i.e., the graphical content is produced by the processing unit 106, which the content encoder 108 receives as input to produce or otherwise generate the encoded graphical content). As another example, the receiver 128 may be configured to receive position information from the source device 102, which may be encoded or unencoded (i.e., not encoded). In some examples, the destination device 104 may be configured to decode encoded graphical content received from the source device 102 in accordance with the techniques described herein. For example, the content decoder 122 may be configured to decode encoded graphical content to produce or otherwise generate decoded graphical content. The processing unit 120 may be configured to use the decoded graphical content to produce or otherwise generate one or more frames for presentment on the one or more displays 131. The transmitter 130 may be configured to perform any transmitting function described herein with respect to the destination device 104. For example, the transmitter 130 may be configured to transmit information to the source device 102, which may include a request for content. The receiver 128 and the transmitter 130 may be combined into a transceiver 132. In such examples, the transceiver 132 may be configured to perform any receiving function and/or transmitting function described herein with respect to the destination device 104.

The content encoder 108 and the content decoder 122 of content generation and coding system 100 represent examples of computing components (e.g., processing units) that may be configured to perform one or more techniques for encoding content and decoding content in accordance with various examples described in this disclosure, respectively. In some examples, the content encoder 108 and the content decoder 122 may be configured to operate in accordance with a content coding standard, such as a video coding standard, a display stream compression standard, or an image compression standard.

As shown in FIG. 1, the source device 102 may be configured to generate encoded content. Accordingly, the source device 102 may be referred to as a content encoding device or a content encoding apparatus. The destination device 104 may be configured to decode the encoded content generated by source device 102. Accordingly, the destination device 104 may be referred to as a content decoding device or a content decoding apparatus. In some examples, the source device 102 and the destination device 104 may be separate devices, as shown. In other examples, source device 102 and destination device 104 may be on or part of the same computing device. In either example, a graphics processing pipeline may be distributed between the two devices. For example, a single graphics processing pipeline may include a plurality of graphics processes. The graphics processing pipeline 107-1 may include one or more graphics processes of the plurality of graphics processes. Similarly, graphics processing pipeline 107-2 may include one or more processes graphics processes of the plurality of graphics processes. In this regard, the graphics processing pipeline 107-1 concatenated or otherwise followed by the graphics processing pipeline 107-2 may result in a full graphics processing pipeline. Otherwise described, the graphics processing pipeline 107-1 may be a partial graphics processing pipeline and the graphics processing pipeline 107-2 may be a partial graphics processing pipeline that, when combined, result in a distributed graphics processing pipeline.

In some examples, a graphics process performed in the graphics processing pipeline 107-1 may not be performed or otherwise repeated in the graphics processing pipeline 107-2. For example, the graphics processing pipeline 107-1 may include determining a list of visible and/or potentially visible primitives and shading the visible and/or potentially visible primitives into a texture atlas (which may be referred to as a shaded texture atlas). In some examples, the processing unit 106 may be configured to shade visible and/or potentially visible primitives into a texture atlas by being configured to perform adaptive shading (i.e., perform adaptive shading frame rate techniques described herein) and/or mip-map biasing. The graphics processing pipeline 107-2 may include rendering a frame based on a shaded texture atlas, frame rate upsampling, and/or lens distortion and chromatic aberration compensation. In such examples, the graphics processing may be described as being distributed between two different devices. For example, by moving one or more graphics processes to the processing unit 106 of the source device 102, the load on the processing unit 120 of the destination device 104 may be reduced and/or more efficiently utilized. As another example, the processing unit 120 may have less processing capabilities than the processing unit 106. By distributing the graphics processing pipeline between the source device 102 and the destination device 104, the destination device may be able to, in some examples, present graphical content that it otherwise would not be able to render; and, therefore, could not present. Other example benefits are described throughout this disclosure.

As described herein, a device, such as the source device 102 and/or the destination device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 102 may be configured to communicate with the destination device 104. For example, destination device 104 may be configured to receive encoded content from the source device 102. In some example, the communication coupling between the source device 102 and the destination device 104 is shown as link 134. Link 134 may comprise any type of medium or device capable of moving the encoded content from source device 102 to the destination device 104.

In the example of FIG. 1, link 134 may comprise a communication medium to enable the source device 102 to transmit encoded content to destination device 104 in real-time. The encoded content may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 102 to the destination device 104. In other examples, link 134 may be a point-to-point connection between source device 102 and destination device 104, such as a wired or wireless display link connection (e.g., an HDMI link, a DisplayPort link, MIPI DSI link, or another link over which encoded content may traverse from the source device 102 to the destination device 104.

In another example, the link 134 may include a storage medium configured to store encoded content generated by the source device 102. In this example, the destination device 104 may be configured to access the storage medium. The storage medium may include a variety of locally-accessed data storage media such as Blu-ray discs, DVDs, CD-ROMs, flash memory, or other suitable digital storage media for storing encoded content.

In another example, the link 134 may include a server or another intermediate storage device configured to store encoded content generated by the source device 102. In this example, the destination device 104 may be configured to access encoded content stored at the server or other intermediate storage device. The server may be a type of server capable of storing encoded content and transmitting the encoded content to the destination device 104.

As described herein, devices described herein may be configured to communicate with each other, such as the source device 102 and the destination device 104. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices is inclusive of more than two devices. For example, a first device may communicatively couple with a second device and the first device may communicatively couple with a third device. In such an example, the first device may be a server.

With reference to FIG. 1, the source device 102 may be described as being communicatively coupled to the destination device 104. In some examples, the term "communicatively coupled" may refer to a communication connection, which may be direct or indirect. The link 134 may, in some examples, represent a communication coupling between the source device 102 and the destination device 104. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 102, may be configured to unicast, broadcast, multicast, or otherwise transmit information (e.g., encoded content) to one or more other devices (e.g., one or more destination devices, which includes the destination device 104). The destination device 104 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the source device 102 and the destination device 104, may be configured to operate in accordance with one or more communication protocols. For example, the source device 102 may be configured to communicate with (e.g., receive information from and/or transmit information to) the destination device 104 using one or more communication protocols. In such an example, the source device 102 may be described as communicating with the destination device 104 over a connection. The connection may be compliant or otherwise be in accordance with a communication protocol. Similarly, the destination device 104 may be configured to communicate with (e.g., receive information from and/or transmit information to) the source device 102 using one or more communication protocols. In such an example, the destination device 104 may be described as communicating with the source device 102 over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, or 5G.

With reference to FIG. 1, the content encoder 108 may be configured to encode graphical content. For example, the content encoder 108 may be configured to encode a shaded texture atlas. In such an example, the content encoder 108 may be described as being configured to encoded pixel data corresponding to the shaded texture atlas. In some examples, a shaded texture atlas may be described as an image or frame generated by the processing unit 106, which the content encoder 108 may be configured to receive as an input. The shaded texture atlas does not constitute a rendered frame. Rather, the shaded texture atlas is used for rendering a frame by, for example, the destination device 104. In some examples, a shaded texture atlas may include one or more re-use portions and one or more updated portions. Such a shaded texture atlas may be referred to as a partially updated shaded texture atlas. In other examples, a shaded texture atlas may be completely re-used. In such examples, the shaded texture atlas may be referred to as a re-use shaded texture atlas. In other examples, a shaded texture atlas may be completely updated. In such examples, the shaded texture atlas may be referred to as a fully updated shaded texture atlas or a non-re-use shaded texture atlas. For example, the processing unit 106 may be configured to generate a first shaded texture atlas and subsequently a second shaded texture atlas where the second shaded texture atlas includes one or more re-use portions (the one or more re-use portions in this example are from the first shaded texture atlas). The second shaded texture atlas in this example constitutes a partially updated shaded texture atlas. When the second shaded texture atlas passes to the content encoder 108, the content encoder 108 may be configured to more efficiently encode the second shaded texture atlas compared to if the second shaded texture atlas did not include the one or more re-use portions. This is because the content encoder 108 may be configured to more efficiently encode the one or more re-use portions in the second shaded texture atlas relative to the first shaded texture atlas, meaning that the content encoder 108 may be configured to leverage the similarities between the first and second shaded texture atlases (i.e., the similarities being the one or more re-use portions in the second shaded texture atlas relative to the same one or more portions in the first shaded texture atlas). For example, when the second shaded texture atlas passes to the content encoder 108, the content encoder 108 may be configured to spend negligible bit rate on the one or more re-use portions (which do not have a change in shading relative to the same one or more portions in the first shaded texture atlas). In such an example, the content encoder 108 may be configured to signal that the one or more re-use portions are a copy or are otherwise the same as the co-located one or more portions in the first shaded texture atlas. Therefore, by performing adaptive shading frame rate, bit rate savings may be introduced.

In some examples, the content encoder 108 may be configured to encode graphical content, such as a shaded texture atlas, as one or more video frames. In some examples, each video frame may correspond to a block of a shaded texture atlas. Otherwise described, a shaded texture atlas may include a plurality of blocks. For example, a shaded texture atlas may be N×M pixels, where N and M are both integer values. In some examples, N may equal M. In other examples, N may not be equal to M. The shaded texture atlas may be represented by a plurality of blocks, where each block has a size smaller than N×M, whether by length and/or width. Each block of the shaded texture atlas may have a size of Q×R, where Q and R are both integer values. In some examples, Q may equal R. In other examples, Q may not be equal to R. Example block sizes include 8×8, 16×16, 32×32, 64×64, 256×256, or 512×512 pixels. Each block of the shaded texture atlas includes one or more sub-blocks. Each sub-block may include one or more shaded primitives. In some examples, each sub-block may include at least two shaded primitives. Each sub-block may have a size of S×T, where S and T are both integer values. In some examples, S may equal T. In other examples, S may not be equal to T. Each sub-block has a size smaller than Q×R, whether by length and/or width. In some examples, each sub-block within the same block may have the same size. In other examples, sub-blocks within the same block may vary in size. In some examples, a portion of a shaded texture atlas may include one or more primitives, one or more blocks, one or more sub-blocks, and/or a region of the shaded texture atlas. A block may include one or more sub-blocks, as described herein. For example, a portion may refer to a primitive, a block of primitives (as described herein), a sub-block of primitives within a block of primitives (as described herein), or a region of the shaded texture atlas.

In some examples, the content encoder 108 may be configured to encode a shaded texture atlas as a single video frame. For example, the entire shaded texture atlas may be provided to the content encoder 108 as a single video frame. In other examples, the content encoder 108 may be configured to encode each respective block of a shaded texture atlas as a respective video frame. In other examples, the content encoder 108 may be configured to encode two or more blocks of a shaded texture atlas as a single video frame.

When the content encoder 108 encodes content, the content encoder 108 may generate a bitstream. The bitstream may have a bit rate, such as bits/time unit, where time unit is any time unit, such as second or minute. The bitstream may include a sequence of bits that form a coded representation of the graphical content and associated data. To generate the bitstream, the content encoder 108 may be configured to perform encoding operations on pixel data, such as pixel data corresponding to a shaded texture atlas. For example, when the content encoder 108 performs encoding operations on image data (e.g., one or more blocks of a shaded texture atlas) provided as input to the content encoder 108, the content encoder 108 may generate a series of coded images and associated data. The associated data may include a set of coding parameters such as a quantization parameter (QP).

Figure 2A:
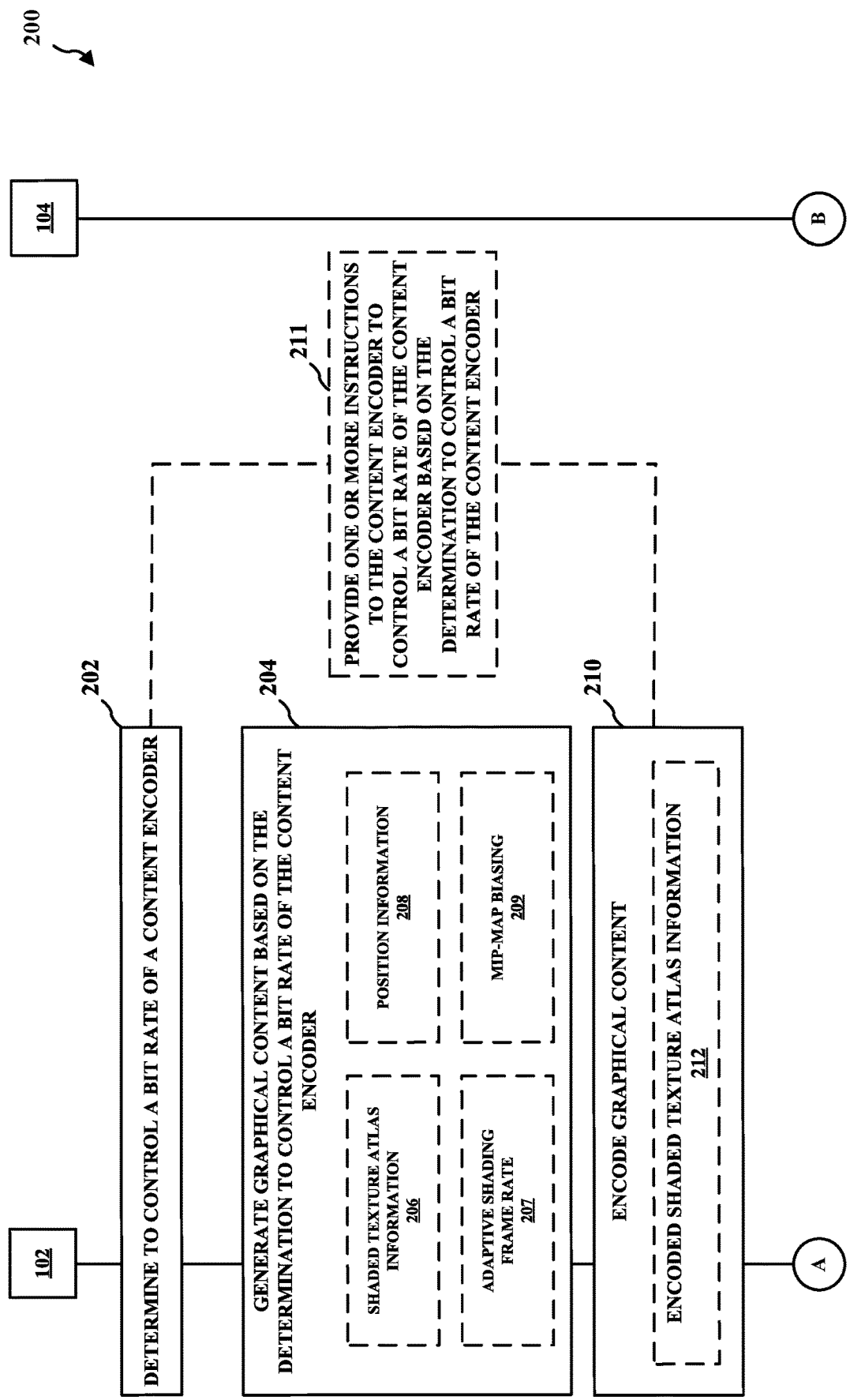
FIGS. 2A-2B illustrate an example flow diagram between a source device and a destination device in accordance with the techniques described herein.
Figure 2B:
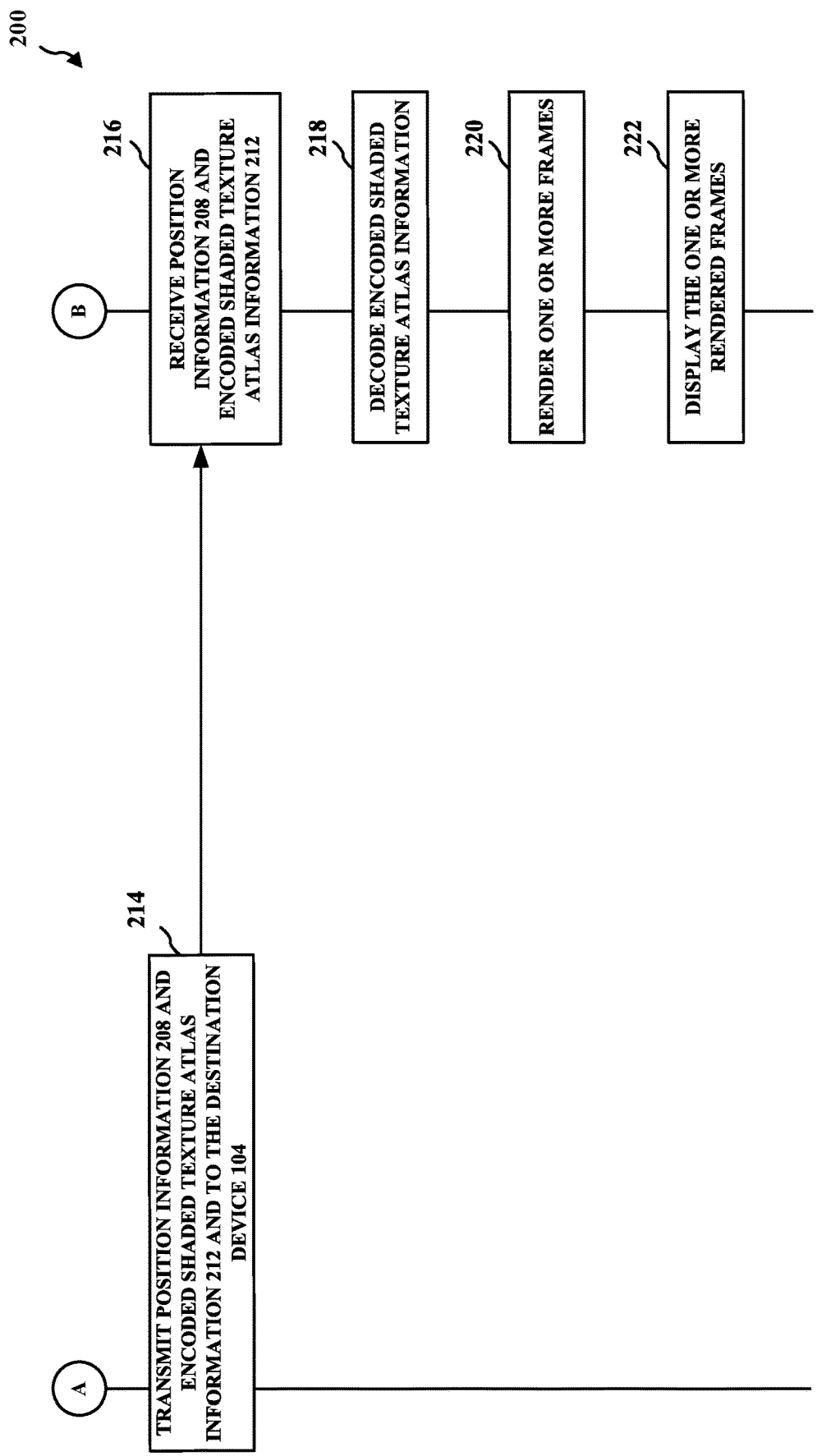

FIGS. 2A and 2B illustrate an example flow diagram 200 between the source device 102 and the destination device 104 in accordance with the techniques described herein. In other examples, one or more techniques described herein may be added to the flow diagram 200 and/or one or more techniques depicted in the flow diagram may be removed.

In the example of FIG. 2A, at block 202, the processing unit 106 of the source device 102 may be configured to determine to control a bit rate of the content encoder 108. For example, the processing unit 106 may be configured to determine to control the bit rate of the content encoder 108 by being configured to increase or decrease the bit rate of the content encoder 108 by generating graphical content in accordance with the techniques described herein. In some examples, the content encoder 108 may be configured to provide information indicative of a bit rate to the processing unit 106. The information indicative of the bit rate may be information indicative of the current bit rate of the content encoder 108, such as the real-time bit rate currently being output by the content encoder 108. The information indicative of the bit rate may be information indicative of a bit rate of the content encoder 108 over a period of time, which may be referred to as an average bit rate. The processing unit 106 may be configured to receive information indicative of a bit rate of the content encoder 108 and compare the bit rate to a threshold value.

If the processing unit 106 determines that the information indicative of the bit rate is below the threshold value, the content encoder 108 is being under-utilized resulting in system inefficiency. In response to this determination, the processing unit 106 may be configured to increase the bit rate of the content encoder in accordance with the techniques described herein. For example, the processing unit 106 may be configured to adjust the generation of graphical content and/or provide one or more instructions to the content encoder 108 to adjust one or more coding parameters (e.g., a Quantization Parameter (QP)) of the content encoder 108 to increase the bit rate of the content encoder 108.

If the processing unit 106 determines that the information indicative of the bit rate is above the threshold value, the content encoder 108 is being over-utilized resulting in a lower frame rate (e.g., if the bit-rate is high, fewer frames per second can be delivered to the destination device. In response to this determination, the processing unit 106 may be configured to reduce the bit rate of the content encoder in accordance with the techniques described herein. For example, the processing unit 106 may be configured to adjust the generation of graphical content and/or provide one or more instructions to the content encoder 108 to adjust one or more coding parameters (e.g., a Quantization Parameter (QP)) of the content encoder 108 to reduce the bit rate of the content encoder 108.

At block 204, the processing unit 106 may be configured to generate graphical content based on the determination to control a bit rate of the content encoder 108. In some examples, the graphical content may include shaded texture atlas information 206 and position information 208. The shaded texture atlas information 206 may include one or more shaded texture atlases. As such, the shaded texture atlas information 206 may include one or more blocks of one or more shaded texture atlases.

In some examples, based on the determination to control the bit rate of the content encoder 108, the processing unit 106 may be configured to provide one or more instructions to the content encoder 108 to control the bit rate of the content encoder 108, as shown by block 211 in FIG. 2A. For example, the one or more instructions provided by the processing unit 106 to the content encoder 108 may control (e.g., modify or adjust) one or more coding parameters, such as a Quantization Parameter (QP)) of the content encoder 108. By adjusting the QP of the content encoder 108, the processing unit 106 may, in this example, be configured to control (e.g., increase or decrease) the bit rate of the content encoder 108.

At block 204, the processing unit 106 may be configured to perform graphics processing pipeline 107-1 to generate the shaded texture atlas information 206 and the position information 208. In accordance with the techniques described herein, the processing unit 106 may be configured to generate the shaded texture atlas information 206 by controlling how the shaded texture atlas information 206 is generated spatially and/or temporally. For example, the processing unit 106 may be configured to generate the shaded texture atlas information 206 by performing an adaptive shading frame rate process 207 and/or by performing a mip-map biasing process 209. The adaptive shading frame rate process 207 and the mip-map biasing process 209 are part of the graphics processing pipeline 107-1. Adaptive shading frame rate, as described herein, controls how the shaded texture atlas information 206 is generated temporally and/or spatially to control the bit rate of the content encoder 108, whereas mip-map biasing controls how the shaded texture atlas information 206 is generated spatially to control the bit rate of the content encoder 108.

At block 204, after having generated the graphical content, the processing unit 106 may be configured to store generated graphical content in memory, such as a graphical content buffer accessible to the processing unit 6 and the content encoder 108. The graphics processing pipeline 107-1 may generate the graphical content. For example, the graphics processing pipeline 107-1 may include the rendering of a 3-Dimensional (3D) scene to generate the graphical content for use by the destination device 104 to render one or more frames for presentment on a display. As an example, the processing unit 106 may be configured to render a 3D scene that includes a 3D mesh of primitives. In some examples, a primitive may be a triangle. In other examples, a primitive may be a shape different from a triangle. The processing unit 106 may be configured to determine, from a particular viewpoint, which primitives are visible, not visible, and/or potentially visible. In some examples, the term "viewpoint" may refer to a virtual camera location relative to the 3D scene. Each primitive in the 3D mesh of primitives has 3D Euclidean coordinates (e.g., x, y, and z coordinates) for each vertex. For example, a primitive that is a triangle includes three vertices, with each vertex being defined by 3D Euclidean coordinates (i.e., a first vertex may have the coordinates of (x1, y1, z1), a second vertex may have the coordinates of (x2, y2, z2), and a third vertex may have the coordinates of (x3, y3, z3). In this example, the location of the primitive relative to a particular view point is defined by the position information, which includes coordinate information for each vertex of the primitive.

In some examples, the processing unit 106 may be configured to generate position information 208 for each frame that is to be rendered by the processing unit 120 of the destination device 104. The source device 102 may be configured to transmit position information 208 without being encoded by the content encoder 108. Otherwise described, the content encoder 108 may, in some examples, be configured to encode one or more blocks corresponding to one or more shaded texture atlases. The content encoder 108 may not receive the position information 208 for encoding thereof.

Position information 208 may include vertex information for each visible primitive and/or potentially visible primitive in the 3D scene relative to a particular viewpoint. For example, the position information 208 may include (1) 3D Euclidean coordinates (e.g., x, y, and z coordinates) for each vertex of each visible primitive and/or potentially visible primitive in the 3D mesh relative to the particular viewpoint, and (2) 2-Dimensional (2D) Euclidean coordinates (e.g., x and y coordinates) for each vertex of each visible primitive and/or potentially visible primitive in a shaded texture atlas. The 2D coordinates respectively associated with each primitive identify a respective location in the shaded texture that each primitive can be found in the shaded texture atlas. Since a shaded texture atlas is 2D, the 2D coordinates that define each point of the primitive also identify the area corresponding to primitive in the shaded texture atlas (i.e., the area of each primitive is bounded by the 2D coordinates). In some examples, the terms location and area in the shaded texture atlas may be synonymous.

In some examples, the 3D coordinates may be actual coordinates. In other examples, the 3D coordinates may be information indicative of a change to coordinates of a previous frame. If the 3D coordinates corresponding to a particular primitive are the same as the 3D coordinates corresponding to the same primitive in the previous frame, the position information may not include any information in the field of the data structure corresponding to the 3D coordinate information. By excluding redundant information or by including only the differences in information, the processing unit 106 may be configured to reduce the amount of data that the source device 102 transmits to the destination device 104. Similarly, the 2D coordinates may be actual coordinates. In other examples, the 2D coordinates may be information indicative of a change to coordinates of a previous frame. If the 2D coordinates corresponding to a particular primitive are the same as the 2D coordinates corresponding to the same primitive in the previous frame, the position information may not include any information in the field of the data structure corresponding to the 2D coordinate information. By excluding redundant information or by including only the differences in information, the processing unit 106 may be configured to reduce the amount of data that the source device 102 transmits to the destination device 104.

The position information 208 may include a primitive identifier to uniquely identify each primitive. In other examples, the position information 208 does not include a primitive identifier. In such examples, the 3D and/or 2D coordinates of each primitive identifier may uniquely identify each primitive.

The position information 208 may include frame identifier that identifies the particular frame that is to be rendered using the position information. The position information 208 may include a shaded texture atlas identifier that identifies the specific shaded texture atlas with which the 2D coordinates are associated for rendering a particular frame. In some examples, unless a shaded texture atlas is to be re-used completely (i.e., in other examples, less than the entire shaded texture atlas may be re-used), the frame identifier and the shaded texture atlas identifier may have the same value. Regarding re-use of less than an entire shaded texture atlas, this refers to re-use of one or more portions of a previously generated shaded texture atlas, meaning the shaded texture atlas may include one or more re-use portions from a previously generated shaded texture atlas and one or more updated portions. In some examples, a portion may refer to a primitive, a block of primitives (as described herein), a sub-block of primitives within a block of primitives (as described herein), or a region of the shaded texture atlas. In such examples where a shaded texture atlas includes one or more re-use portions and one or more updated portions, such a shaded texture atlas may be referred to as a partially updated shaded texture atlas because the shading in the one or more re-use portions is not updated (i.e., the shading in the one or more re-use portions is not re-generated by the processing unit 106 but instead is copied or otherwise re-used from a previously generated shaded texture atlas) but the shading in the one or more updated portions is updated (i.e., the shading in the one or more updated portions is generated by the processing unit 106 and is not copied or otherwise re-used from a previously generated shaded texture atlas).

The processing unit 106 may be configured to generate a plurality of shaded texture atlases. As described herein, a shaded texture may or may not include one or more re-use portions. In examples where a shaded texture does not include any re-use portions, such a shaded texture atlas may be referred to as a new shaded texture atlas, a non-re-use shaded texture atlas, or a fully updated shaded texture atlas. It is understood that a fully updated shaded texture atlas may include shading for one or more portions that is the same as the shading for the same one or more portions in a previously generated shaded texture atlas. However, such an overlap in shading does not mean that the overlapping shaded portions were copied or otherwise re-used from a previously generated shaded texture atlas. Instead, such an overlap infers that the shading did not change in such portions but was nonetheless generated by the processing unit 106. Similarly, it is understood that a partially updated shaded texture atlas may include shading for one or more updated portions that is the same as the shading for the same one or more portions in a previously generated shaded texture atlas. However, such an overlap in shading does not mean that the overlapping shaded portions were copied or otherwise re-used from a previously generated shaded texture atlas. Instead, such an overlap infers that the shading in the updated portions did not change in such portions but was nonetheless generated by the processing unit 106. In this regard, it is understood that an updated portion does not necessarily mean the shading cannot be the same or otherwise have some overlap in comparison to a portion in a shaded texture atlas that was previously generated. Rather, an updated portion refers to a portion for which the processing unit 106 does not re-use or otherwise copy the shading from a previously generated shaded texture atlas; and, instead, generates the shading for the updated portion. Such generation for an updated portion may, by happenstance, be the same as or similar to shading in a portion of a shaded texture atlas that was previously generated.

In accordance with the techniques described herein, the processing unit 106 may be configured to re-use a previously generated shaded texture atlas and/or re-use one or more portions of a previously generated shaded texture atlas when generating a subsequent shaded texture atlas. For example, the processing unit 106 may be configured to re-use a previously generated shaded texture atlas and/or re-use one or more portions of a previously generated shaded texture atlas for the rendering of more than one frame, such as a first frame and a second frame. In an example where the processing unit 106 completely re-uses a previously generated shaded texture atlas, the processing unit 106, the shaded texture atlas identifier may be used by the processing unit 120 to determine which shaded texture atlas to use when rendering a frame based on the position information 208 received from the source device 102. Therefore, the position information 208 includes information that is frame specific (i.e., the 3D coordinates) and information that is shaded texture atlas specific (i.e., the 2D coordinates). The 2D coordinates are still frame specific in that they are being used in conjunction with a shaded texture atlas that is to be used for a particular frame. In such an example, the processing unit 106 may be configured to not provide the re-used shaded texture atlas to the content encoder 108. In another example where the processing unit 106 completely re-uses a previously generated shaded texture atlas, the processing unit 106, the processing unit 106 may be configured to still provide the re-used shaded texture atlas to the content encoder 108. While not providing the completely re-used shaded texture atlas to the content encoder 108 a subsequent time will provide for greater bit rate savings, providing the completely re-used shaded texture atlas to the content encoder 108 still introduces bit rate savings, just less compared to the bit rate savings by not providing the completely re-used shaded texture atlas to the content encoder 108.

Figure 4G:
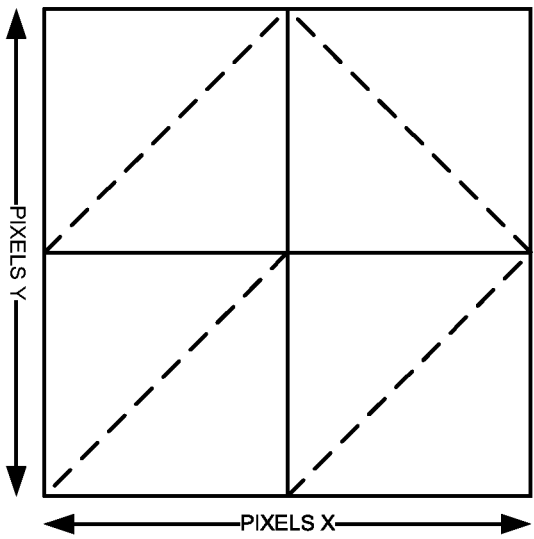
FIG. 4G illustrates an example of a block with a plurality of sub-blocks in accordance with the techniques described herein.
Figure 4H:
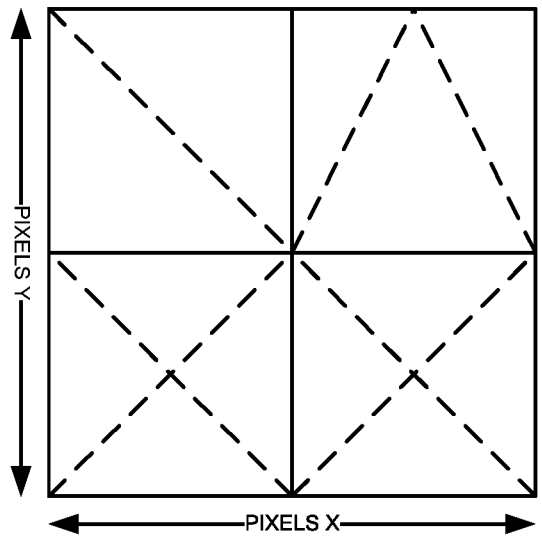
FIG. 4H illustrates an example of a block with a plurality of sub-blocks in accordance with the techniques described herein.
Figure 4I:
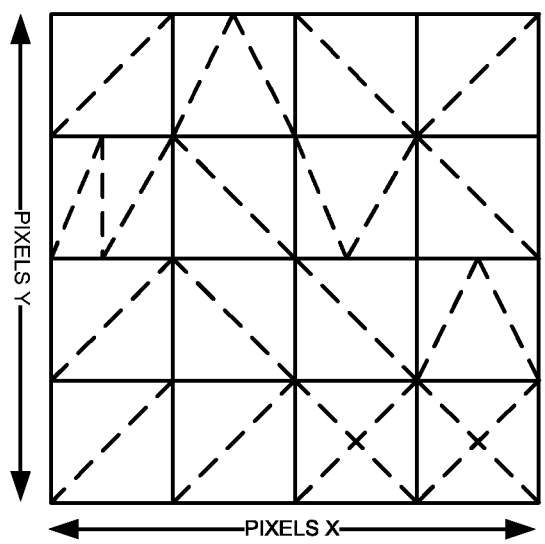
FIG. 4I illustrates an example of a block with a plurality of sub-blocks in accordance with the techniques described herein.
Figure 4J:
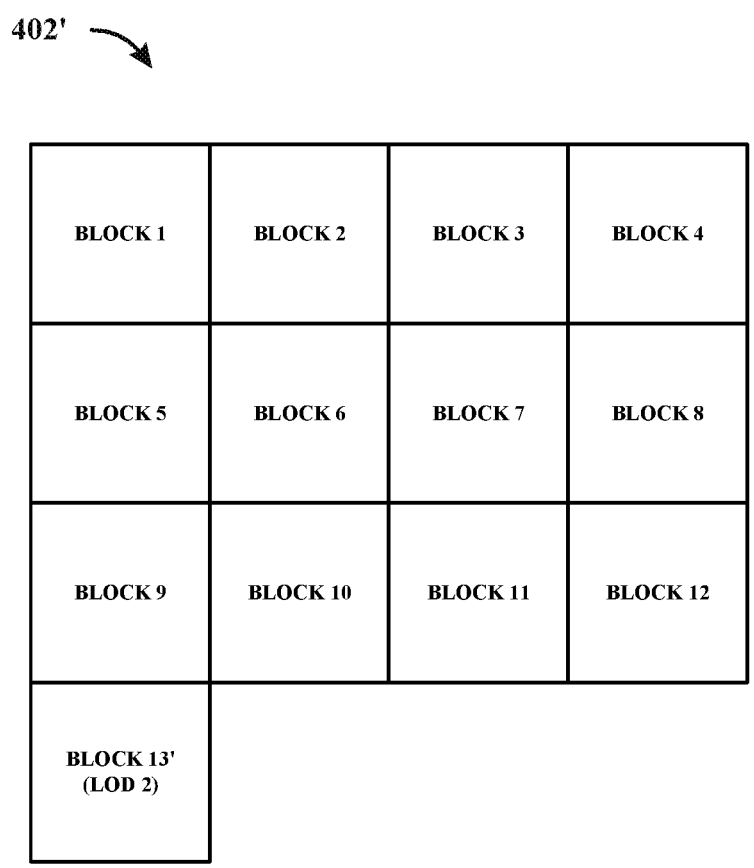
FIG. 4J illustrates an example shaded texture atlas in accordance with the techniques of this disclosure.
Figures 4K, 4L:
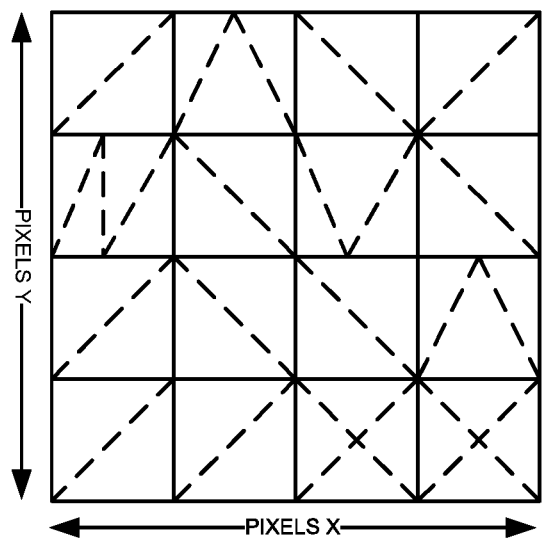
FIG. 4K illustrates an example shaded texture atlas in accordance with the techniques of this disclosure.
FIG. 4L illustrates an example of a block with a plurality of sub-blocks in accordance with the techniques described herein.
Figure 4M:
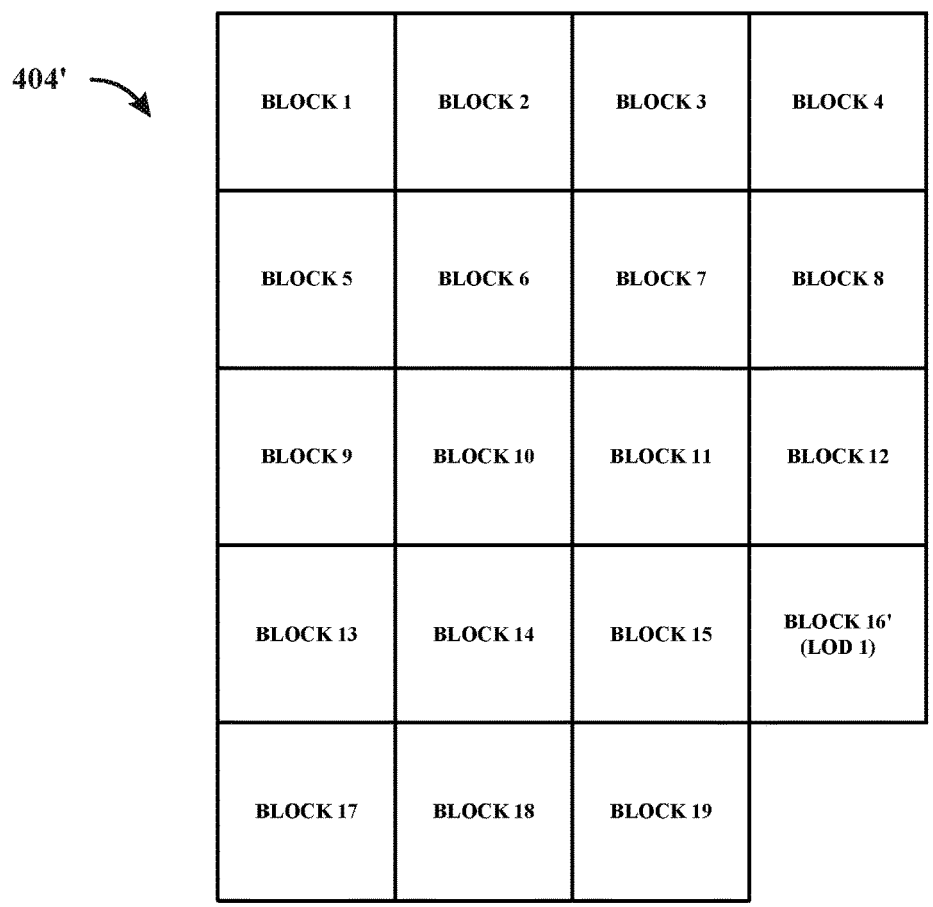
FIG. 4M illustrates an example shaded texture atlas in accordance with the techniques of this disclosure.
Figure 4N:
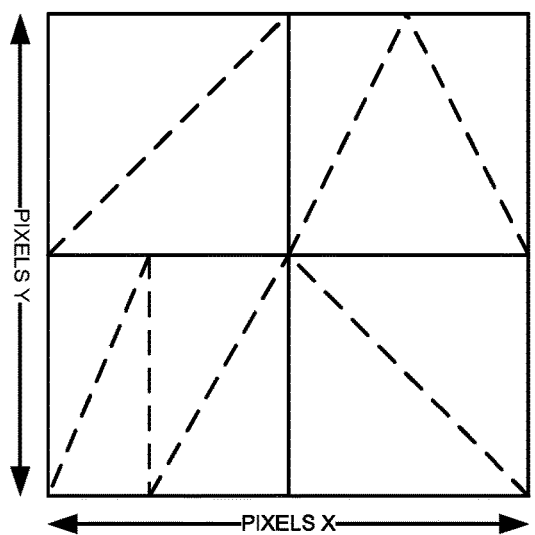
FIG. 4N illustrates an example of a block with a plurality of sub-blocks in accordance with the techniques described herein.
Figure 4O:
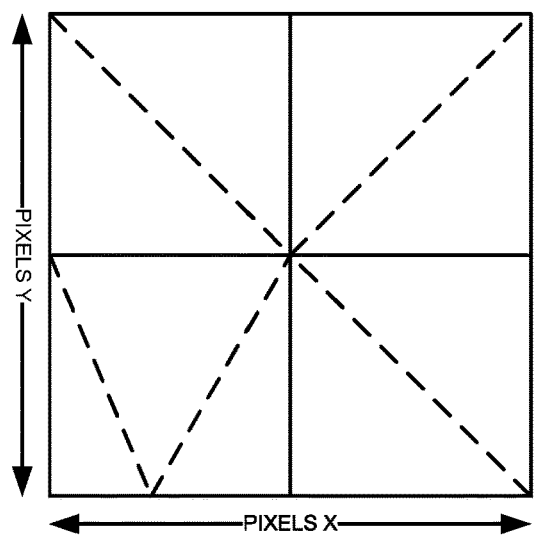
FIG. 4O illustrates an example of a block with a plurality of sub-blocks in accordance with the techniques described herein.
Figure 4P:
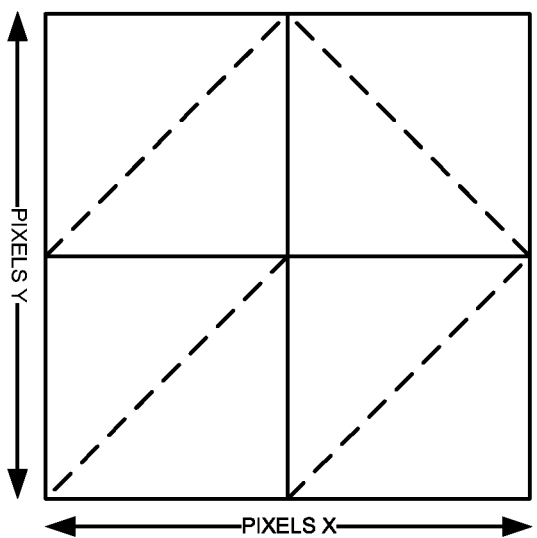
FIG. 4P illustrates an example of a block with a plurality of sub-blocks in accordance with the techniques described herein.
Figure 4Q:
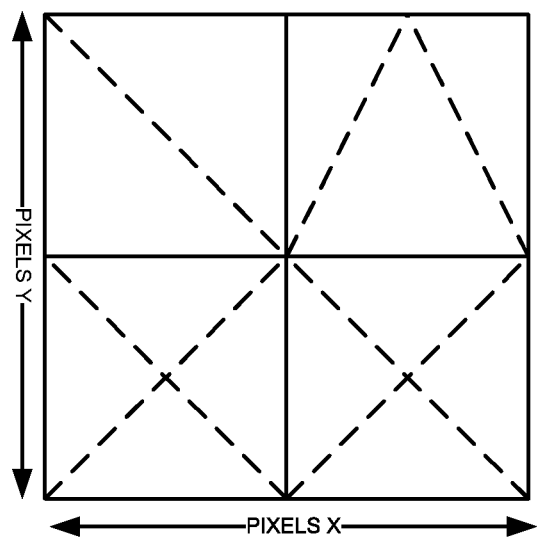
FIG. 4Q illustrates an example of a block with a plurality of sub-blocks in accordance with the techniques described herein.
Figure 4R:
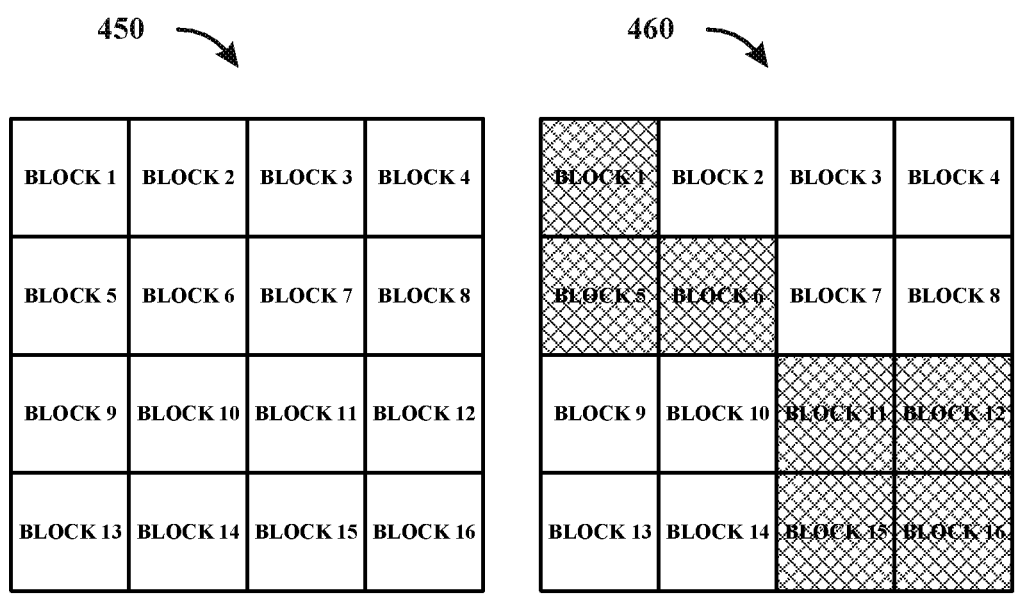
FIG. 4R illustrates two examples of shaded texture atlases in accordance with the techniques described herein.

FIG. 4R illustrates an example shaded texture atlas 450 that the processing unit 106 may be configured to generate. In this example, the shaded texture atlas 450 includes 16 blocks, each of which may include one or more sub-blocks and may include one or more primitives. FIG. 4R also illustrates an example of a subsequent shaded texture atlas 460. In some examples, the term "subsequent" may refer to immediately subsequent, as in, the next shaded texture atlas generated by the processing unit 106 that follows the generation of the shaded texture atlas 450. In other examples, the term "subsequent" may not refer to immediately subsequent, as in, the processing unit 106 may be configured to generate one or more shaded texture atlases between the generation of the shaded texture atlas 450 and the shaded texture atlas 460. In both of these examples, the shaded texture atlas 450 may be referred to as a previously generated shaded texture atlas relative to the shaded texture atlas 460. The shaded blocks in the shaded texture atlas 460 are examples of re-use portions and the unshaded blocks in the shaded texture atlas 460 are examples of updated portions. The re-use portions and the updated portions may differ in other examples.

FIGS. 3A-3D illustrate examples of position information 208. In some examples, the examples of position information 208 in FIGS. 3A-3D represent a data structure with various fields. In the example of FIG. 3A, position information 208-1 is an example of position information 208 to be used for rendering a first frame (i.e., frame 1). Similarly, in the example of FIG. 3B, position information 208-2 is an example of position information 208 to be used for rendering a second frame (i.e., frame 2); and, in the example of FIG. 3C, position information 208-3 is an example of position information 208 to be used for rendering a third frame (i.e., frame 3). FIG. 3D illustrates an example of Mth position information 208-M to be used for rendering the Mth frame, where M is any integer value. The position information in each of the examples shown in FIGS. 3A-3D is shown as including one or more of: (1) a frame identifier, (2) a shaded texture atlas identifier, (3) a primitive identifier, (4) primitive position information in a 3D mesh corresponding to a particular viewpoint associated with the respective frame to be rendered (i.e., the 3D Euclidean coordinates), or (5) primitive position information in the shaded texture atlas associated with the respective frame to be rendered (i.e., the 2D Euclidean coordinates).

In some examples, each position information 208-1 through 208-M may each be respectively associated with a single respective shaded texture atlas. Otherwise described, the processing unit 6 may be configured to generate a shaded texture atlas for each frame to be rendered by the processing unit 120. In other examples, a shaded texture atlas may be associated with the position information corresponding to two or more frames to be rendered by the processing unit 120, such as when the processing unit 106 performs adaptive shading frame rate as described herein.

As shown in FIGS. 3A-3D, the processing unit 106 may be configured to generate 3D position information for each frame to be rendered by the processing unit 120 regardless of whether a shaded texture atlas is generated for each frame to be rendered by the processing unit 120. For example, the processing unit 106 may be configured to generate 3D position information for each frame to be rendered by the processing unit 120, where each frame is associated with a shaded texture atlas (e.g., a new shaded texture atlas, a partially updated texture atlas, or a completely re-used shaded texture atlas). As described herein, when a shaded texture atlas is completely re-used, the processing unit 106 may or may not provide the completely re-used shaded texture atlas to the content encoder 108. In the example of position information 208-1 shown in FIG. 3A, the 2D coordinates correspond to the shaded texture atlas associated with the shaded texture atlas identifier 1. In the example of position information 208-2 shown in FIG. 3B, the 2D coordinates correspond to the shaded texture atlas associated with the shaded texture atlas identifier 2. Otherwise described, the processing unit 6 may be configured to generate a first shaded texture atlas that is to be used by the processing unit 120 for rendering frame 1 and a second shaded texture atlas that is to be used by the processing unit 120 for rendering frame 2. In the example of position information 208-3 shown in FIG. 3C, the 2D coordinates correspond to the shaded texture atlas associated with the shaded texture atlas identifier 2. Otherwise described, the processing unit 6 may be configured to generate the second shaded texture atlas that is to be used by the processing unit 120 for rendering frame 2 and instruct the processing unit 120 to re-use the second shaded texture atlas for rendering frame 3. The shaded texture atlas identifier of 2 in position information 208-3 may, in some examples, be the instruction to re-use the second shaded texture atlas for rendering frame 3. In some examples, the position information may not include a shaded texture atlas identifier, such as in examples where the processing unit 6 provides a completely re-used shaded texture atlas to the content encoder 108.

As described above, position information corresponding to a current frame to be rendered may only include information indicative of a change relative to position information corresponding to a previous frame to be rendered. For example, the processing unit 106 may be configured to generate the position information 208-1 and subsequently generate the position information 208-2. However, position information 208-2 may only include any change in position information (e.g., any addition and/or removal) relative to position information 208-1. For example, if the 3D coordinates for a first vertex of primitive 1 for a first frame to be rendered are (x1, y1, z1) and the coordinates for the first vertex of primitive 1 for a second frame to be rendered are (x2, y2, z2), then the position information for the second frame to be rendered may be (x2−x1, y2−y1, z2−z1).

As used herein, a frame input to the content encoder 108 is distinguishable from a frame that is to be rendered by processing unit 120. A frame input to the content encoder 108 may be referred to as an input frame. For example, the graphics processing pipeline 107-2 may generate rendered frames using graphical content that was generated by the graphics processing pipeline 107-1. A frame input to the content encoder 108 (i.e., an input frame) may include a single shaded texture atlas or a portion of a shaded texture atlas. A portion of a shaded texture atlas may include one or more blocks of a texture atlas. In some examples, a frame input to the content encoder 108 (i.e., an input frame) may include two or more shaded texture atlases. In other examples, a frame input to the content encoder 108 (i.e., an input frame) may include one or more blocks from two or more shaded texture atlases.

In some examples, the processing unit 106 may be configured to provide information to the content encoder 108 indicative of one or more shaded texture atlases. The information indicative of a shaded texture atlas may include information that identifies the number of blocks included in the shaded texture atlas, the size of each block included in the shaded texture atlas, and the number of sub-blocks included in each respective block of the shaded texture atlas. Based on the information indicative of one or more shaded texture atlases, the content encoder 108 may be configured to read one or more blocks from one or more shaded texture atlases stored in a graphical content buffer accessible to both the processing unit 106 and the content encoder 108. The one or more blocks read from the graphical content buffer may constitute the frame input to the content encoder 108. For example, the content encoder 108 may be configured to generate the input frame (which includes one or more blocks from one or more shaded texture atlases, depending on the example) that is to be encoded by the content encoder 108 according to a content coding standard.

In other examples, the processing unit 106 may be configured to generate the input frame. For example, the processing unit 106 may be configured to generate an input frame based on information indicative of one or more shaded texture atlases. The information indicative of a shaded texture atlas may include information that identifies the number of blocks included in the shaded texture atlas, the size of each block included in the shaded texture atlas, and the number of sub-blocks included in each respective block of the shaded texture atlas. Based on the information indicative of one or more texture shaded atlases, the processing unit 106 may be configured to generate an input frame that includes one or more blocks from one or more shaded texture atlases. The processing unit 106 may be configured to store the generated input frame into an input frame buffer accessible to both the processing unit 106 and the content encoder 108. The content encoder 108 may be configured to read the input frame from the input frame buffer, and subsequently encode the input frame according to a content coding standard.

Referring to the shaded texture atlas information 206, the shaded texture atlas information 206 may include one or more blocks of one or more shaded texture atlases. In other examples, the shaded texture atlas information 206 may include one or more shaded texture atlases. In some examples, the location of each primitive across multiple shaded texture atlases is the same. FIG. 4A illustrates an example shaded texture atlas 400 that the processing unit 106 may be configured to generate. The shaded texture atlas includes a plurality of blocks, shown as blocks 1-16. In the example of FIG. 4A, each block of blocks 1-16 is shown as being the same size. However, in other examples, blocks 1-16 may vary in size. Each block of the shaded texture atlas 400 includes one or more sub-blocks. In the example of a block having a single sub-block, the block and the sub-block are one and the same. Each sub-block may include one or more shaded primitives. In some examples, each sub-block may include at least two shaded primitives, such as when the primitives are triangles. Blocks may have different levels of detail (LOD), which may also be described as different resolution levels.

FIGS. 4B and 4C illustrate example blocks 4 and 6, respectively, from the shaded texture atlas 400 with different LODs. The hashed lines with the border lines of the sub-blocks in FIGS. 4B and 4C represent example primitives. For example, various patterns of shaded triangles are shown in FIGS. 4B and 4C; however, it is understood that these are just examples of shaded primitives and that a shaded texture atlas may be generated with shaded primitives in any layout. In the examples of FIGS. 4B and 4C, blocks 4 and 6 are the same size (i.e., x by y pixels), which means that the sub-blocks of block 4 have four times the resolution as the sub-blocks in block 6 in the example shown. However, block 4 has a higher LOD than block 6 because block 4 has fewer sub-blocks than block 6. Otherwise described, because blocks 4 and 6 are of the same size, each sub-block in block 4 has more pixels than the sub-blocks in block 6 to represent the primitives. Since less pixels are available to represent the primitives in each sub-block of block 6, the primitives have less detail; and, therefore, may be considered to have a lower LOD. Having a lower LOD may also be referred to as having a lower resolution and having a higher LOD may also be referred to as having a higher resolution at the sub-block level. Referring to the examples of FIGS. 4B and 4C, the resolution of each sub-block in block 6 is one-quarter resolution of each sub-block in block 4. Sub-blocks of the same size have the same LOD (i.e., the same resolution). Larger sub-blocks have a greater LOD than smaller sub-blocks because larger sub-blocks have more pixels; and, therefore, can represent a primitive with more detail.

Referring to the adaptive shading frame rate process 207, the processing unit 106 may be configured to control the shading of primitives in the temporal domain resulting in controlling the bit rate of the content encoder 108. Otherwise described, the processing unit 106 may be configured to control the rate at which shaded texture atlases are generated for a plurality of frames to be rendered by the destination device 104. For example, the processing unit 106 may be configured to refrain from generating a shaded texture atlas for a particular frame. Instead of generating a shaded texture atlas for the particular frame, the processing unit 106 may be configured to provide information to the destination device 104 regarding which shaded texture atlas is to be re-used for rendering the particular frame. By not generating the shaded texture atlas for the particular frame, the bit rate of the content encoder 108 is reduced because the content encoder 108 has less content to encode (i.e., the shaded texture atlas to be re-used for the particular frame is not encoded a second time). The information provided to the destination device 104 regarding which shaded texture atlas is to be re-used for the particular frame may include information in the position information 208. For example, if the particular frame is frame 3 in the example frames referenced with respect to FIGS. 3A-D, then the shaded texture atlas identifier of "2" may constitute the information provided to the destination device 104 regarding which shaded texture atlas is to be re-used for the particular frame (i.e., frame 3 in this specific example). In this example, the shaded texture atlas identifier of "2" indicates to the destination device 104 (i.e., the processing unit 120 of the destination device 104) that the shaded texture atlas received and used to render frame 2 associated with the position information 208-2 is to be re-used to render frame 3.

Therefore, when the adaptive shading frame rate process 207 is performed by the processing unit 106, at least one shaded texture atlas generated by the processing unit 106 may correspond to more than one frame. For example, a shaded texture atlas that is generated for use in rendering a first frame and that is re-used for rendering a second frame may be described as corresponding to two frames: the first frame and the second frame. As another example, the processing unit 106 may be configured to generate a shaded texture atlas for use in rendering, by the destination device 104, at least two frames. To increase the bit rate of the content encoder 108, the processing unit 106 may be configured to refrain from performing the adaptive shading frame rate process 207. In this example, the processing unit 106 may be described as determining that a shaded texture atlas is not to be re-used so that the bit rate of the content encoder 108 is increased (such as when transitioning from using adaptive shading frame rate to not using adaptive shading frame rate) or stays the same (such as when adaptive shading frame rate is not currently being implemented at the time of the determination). However, to decrease the bit rate of the content encoder 108, the processing unit 106 may be configured to perform the adaptive shading frame rate process 207. For example, the processing unit 106 may be configured to determine to control the bit rate of the content encoder 108 by determining that the bit rate of the content encoder 108 is be decreased. In this example, the processing unit 106 may be described as determining that a shaded texture atlas is to be re-used so that the bit rate of the content encoder 108 is decreased.

A shaded texture atlas or a portion of a shaded texture atlas may be re-used one or more times. For example, a shaded texture atlas or a portion of a shaded texture atlas may be re-used N times, where N is any integer value. As another example, the shading may be updated every M frames (i.e., a shaded texture atlas is generated every M frames), where M is any integer value. However, as N or M increase, shading error may also increase. Shading error may be referred to as shading drift due to the accumulation of small shading changes that are not being rendered as a result of re-using a shaded texture atlas. The amount of motion in a scene, the speed of such motion in a scene, and the amount of lighting changes in the scene may affect whether shading drift is perceivable. This information may be referred to as lighting and motion information. The processing unit 106 may be configured to determine lighting and motion information; and, based on this information, determine whether to generate a shaded texture atlas for a particular frame or re-use a previously generated shaded texture atlas for the particular frame. Otherwise described, the processing unit 106 may be configured to determine the amount of motion in a scene, the speed of such motion in a scene, and/or the amount of lighting changes in the scene.

In some examples, the processing unit 106 may be configured to determine motion information by taking the difference between one or more vertices associated with one or more primitives corresponding to a first frame to be rendered and one or more vertices associated with the same one or more primitives corresponding to a second frame to be rendered. The processing unit 106 may use this motion information as a metric to determine whether to apply adaptive shading frame rate. For example, if the motion information metric is above a movement threshold value (indicating a high amount of movement, for example), then the processing unit 106 may be configured to not apply adaptive shading frame rate. As another example, if the motion information metric is below a movement threshold value (indicating a low amount of movement, for example), then the processing unit 106 may be configured to apply adaptive shading frame rate. Similarly, the processing unit 106 may be configured to determine lighting information by taking the difference between the lighting associated with a first frame to be rendered and the lighting associated with a second frame to be rendered. The processing unit 106 may use this lighting information as a metric to determine whether to apply adaptive shading frame rate. For example, if the lighting information metric is above a lighting change threshold value (indicating a large change in lighting, for example), then the processing unit 106 may be configured to not apply adaptive shading frame rate. As another example, if the lighting change information metric is below a movement threshold value (indicating a small change in lighting, for example), then the processing unit 106 may be configured to apply adaptive shading frame rate.

Figure 2C:
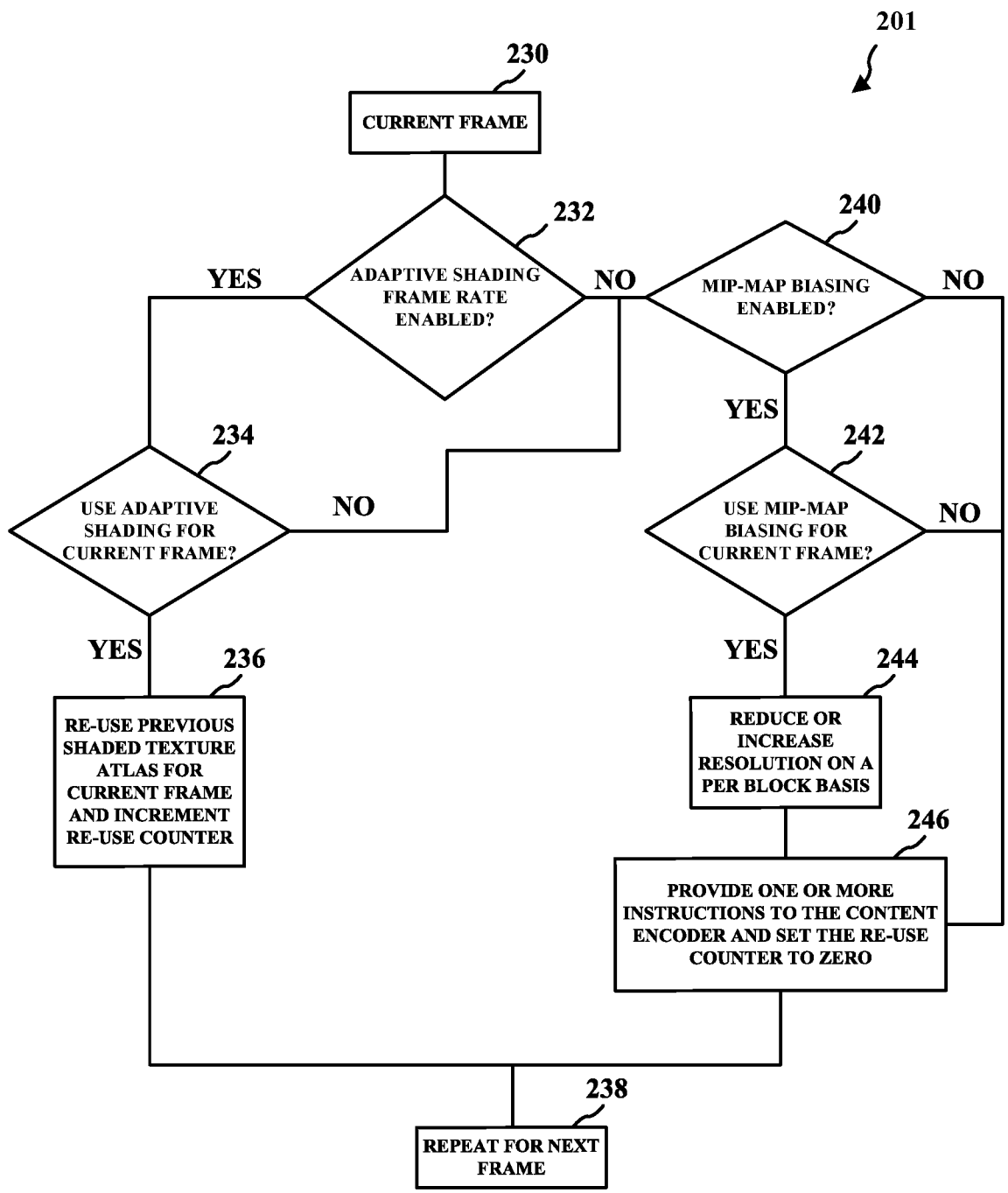
FIG. 2C illustrates an example of combining bit rate control techniques in accordance with the techniques of this disclosure.

Therefore, in some examples, the processing unit 106 may be configured to determine whether to perform adaptive shading frame rate (i.e., whether to re-use a shaded texture atlas and/or whether to re-use one or more portions of a shaded texture atlas) by being configured to determine a number of times a shaded texture atlas or a portion of a shaded texture atlas has been re-used or used by the destination device 104 for rendering one or more frames different from the original frame for which the shaded texture atlas was originally generated by the processing unit 106. The number of times a shaded texture atlas has been re-used or used may be kept track of using a counter. FIG. 2C illustrates an example where a re-use counter is used. It is understood that the number of times a shaded texture atlas or a portion of a shaded texture atlas has been used includes the original use associated with the frame for which the shaded texture atlas was generated, and that the number of times the shaded texture atlas or a portion of the shaded texture atlas has been re-used excludes the original use associated with the frame for which the shaded texture atlas was generated.

In some examples, the processing unit 106 may be configured to determine that a shaded texture atlas or a portion of a shaded texture atlas is to be re-used by the destination device 104 for rendering a particular frame only when the number of times the shaded texture atlas or the portion of the shaded texture atlas has been re-used is less than a threshold value. In other examples, the processing unit 106 may be configured to determine that a shaded texture atlas or a portion of a shaded texture atlas is to be used by the destination device 104 for rendering a particular frame only when the number of times the shaded texture atlas or the portion of the shaded texture atlas has been used is less than a threshold value, which may be referred to as a use or re-use threshold value, depending on the example. The threshold value in these examples may be M, where M is any integer value. However, as M increases, the shading error may also increase. Therefore, the processing unit 106 may be configured to use the threshold value to control shading error, which serves as a type of quality control over the content that is ultimately to be rendered by the processing unit 120 and displayed to a user. For example, a low value of M may result in a higher bit rate produced by the content encoder 108, whereas a high value of M may result in a lower bit rate produced by the content encoder 108 but with more shading error in each frame that is subsequent to the original frame for which the shaded texture atlas or the portion of the shaded texture atlas that is being re-used was generated.

In some examples, the processing unit 106 may be configured to perform the adaptive shading frame rate process 207 by refraining from generating a shaded texture atlas for one or more frames to be rendered by the destination device 104. For example, the processing unit 106 may be configured to generate position information 208 for every frame to be rendered by the destination device 104 (i.e., the processing unit 106 may be configured to generate frame-specific position information for each frame), but may not generate a shaded texture atlas for every frame to be rendered (i.e., the processing unit 106 may be configured to refrain from generating a frame-specific shaded texture atlas for each frame). In some examples, the processing unit 106 may be configured to refrain from generating shaded texture atlases according to a pattern, such as only generate a shaded texture atlas for every other frame. In this example, a shaded texture atlas may be re-used for one frame, meaning that each shaded texture atlas may be used twice: once for the frame for which it was originally generated and once for the frame subsequent to the frame for which it was originally generated. In another example, the pattern may be that a shaded texture atlas is generated for every Mth frame, where M is any integer value. As one example, where M is 3, a shaded texture atlas may be re-used for two frames, meaning that each shaded texture atlas may be used three times: once for the frame for which it was originally generated and twice (once for each of two frames that are subsequent to the frame for which it was originally generated).

Referring to the mip-map biasing process 209, the processing unit 106 may be configured to control the shading of primitives in the spatial domain resulting in controlling the bit rate of the content encoder 108. For example, the processing unit 106 may be configured to shade less important triangles (e.g., flatter triangles) in a block of a shaded texture atlas using a lower resolution/lower LOD than what it would otherwise be. This reduces the bit rate of the content encoder 108. As another example, the processing unit 106 may be configured to shade more important triangles (e.g., complex triangles) in a block of a shaded texture atlas using a higher resolution/higher LOD than what it would otherwise be. This increases the bit rate the content encoder 108 needs to spend on such triangles. In such examples, the processing unit 106 is configured to control the shading of primitives in a shaded texture atlas based on primitive flatness (which may be referred to as triangle flatness in examples where the primitives are triangles). In some examples, primitive flatness of a primitive may refer to whether the primitive lies in a relatively flat area of the 3-D mesh or not. The processing unit 106 may be configured to determine primitive flatness by measuring the changes in normal directions. If the normal directions do not change much, then the primitive is flat. Otherwise described, the processing unit 106 may be configured to determine primitive flatness by measuring the magnitude of variation of normals across the surface of a primitive.

The processing unit 106 may use primitive flatness information as a metric to determine whether to apply mip-map biasing. Primitive flatness may be determined for each primitive to be shaded in a block of a shaded texture atlas.

The processing unit 106 may be configured to determine the average flatness of a block by adding the primitive flatness associated with each primitive of a block and dividing the sum by the total number of primitives in the block. The average flatness of a block may also be referred to a block's flatness. If a block's flatness is above a flatness threshold value (indicating that the block includes primitives that are, on average, not flat, for example), then the processing unit 106 may be configured to not apply mip-map biasing. As another example, if a block's flatness is below a flatness threshold value (indicating that the block includes primitives that are, on average, flat, for example), then the processing unit 106 may be configured to apply mip-map biasing.

In some examples, the processing unit 106 may be configured to apply or not apply mip-map biasing based on foveated rendering. As described herein, applying mip-map biasing may increase or decrease the resolution of primitives. For example, the processing unit 106 may be configured to mip-map biasing to reduce the LOD/resolution of primitives that are in the peripheral of a scene. As another example, the processing unit 106 may be configured to mip-map biasing to increase the LOD/resolution of primitives that are in location of the scene determined to be a focal point.

As an example of mip-map biasing with reference to FIGS. 4A-C, the processing unit 106 may be configured to control the bit rate of the content encoder 108 by determining that the bit rate of the content encoder 108 is be decreased. In this example, the processing unit 106 may be described as determining to reduce LOD/resolution of one or more primitives in the shaded texture atlas. As an example, instead of shading the primitives shown in block 4 of FIG. 4B, the processing unit 106 may be configured to lower the LOD/resolution to, for example, the resolution shown in FIG. 4C. In some examples, performing mip-map biasing to reduce the LOD/resolution may include increasing the number of sub-blocks included in a block while maintaining the size of the block. With respect to block 4 in the example of FIG. 4A, if mip-map biasing is used to lower the LOD from LOD 1 to LOD 2, then block 4 may include 12 additional sub-blocks. Therefore, the processing unit 106 may be configured to combine sub-blocks from multiple blocks into a single sub-block. For example, the processing unit 106 may be configured to determine that the primitives corresponding to multiple blocks may be encoded using a lower LOD to decrease the bit rate of the content encoder 108. The processing unit 106 may adjust the generation of the shaded texture atlas so that the sub-blocks corresponding to each of the blocks that have primitives to be shaded using a lower LOD/resolution are part of a single block. FIGS. 4D-J depict such an example.

FIG. 4D illustrates an example shaded texture atlas 402 that would be generated if the processing unit 106 did not perform mip-map biasing in accordance with the techniques described herein. However, in this example, the processing unit 106 has determined to control the bit rate (reduce the bit rate in this example) of the content encoder 108. Before generating the shaded texture atlas 402, the processing unit 106 has determined that the primitives in blocks 13-16 are to be shaded using a second resolution instead of a first resolution. Here, the second resolution is less than the first resolution. FIGS. 4E-H illustrate example blocks 13-16, respectively, from the shaded texture atlas 402 with the same LOD 1. In other examples, blocks 13-16 may have different LODs but may nonetheless be combined using mip-map biasing as described herein. The hashed lines with the border lines of the sub-blocks in FIGS. 4E-H represent example primitives.

Using the mip-map biasing process 209, the processing unit 106 may be configured to shade the primitives of blocks 13-16 using a second resolution instead of the first resolution. In this example, the processing unit 106 is configured to combine the sub-blocks of blocks 13-16 into a single block (i.e., block 13' shown in FIG. 4J) since the second resolution is less than the first resolution. In examples where the second resolution is greater than the first resolution, the processing unit 106 may be configured to generate a larger shaded texture atlas with more blocks (instead of fewer blocks). FIG. 4I shows each of the sub-blocks of blocks 13-16 in the block 13' of the mip-map biased shaded texture atlas 402'. As shown, the mip-map biased shaded texture atlas 402' has less pixels than the shaded texture atlas 402 that would have been generated. With fewer pixels, the bit rate of the content encoder 108 will be reduced when encoding the mip-map biased shaded texture atlas 402' compared to the shaded texture atlas 402 had the latter been generated.

In some examples, performing mip-map biasing to increase the LOD/resolution may include reducing the number of sub-blocks included in a block while maintaining the size of the block. With respect to block 6 in the example of FIG. 4A, if mip-map biasing is used to increase the LOD from LOD 2 to LOD 1, then block 6 may only include 4 sub-blocks. Therefore, the processing unit 106 may be configured to generate the shaded texture atlas with additional blocks to include the primitives of the 12 other sub-blocks of block 6. For example, the processing unit 106 may be configured to determine that the primitives corresponding to multiple blocks may be encoded using a higher LOD to increase the bit rate of the content encoder 108. The processing unit 106 may adjust the generation of the shaded texture atlas so that sub-blocks corresponding to block 6 are split into multiple blocks having a higher LOD/resolution. FIGS. 4K-Q depict such an example.

FIG. 4K illustrates an example shaded texture atlas 404 that would be generated if the processing unit 106 did not perform mip-map biasing in accordance with the techniques described herein. However, in this example, the processing unit 106 has determined to control the bit rate (increase the bit rate in this example) of the content encoder 108. Before generating the shaded texture atlas 404, the processing unit 106 has determined that the primitives in block 16 are to be shaded using a second resolution instead of a first resolution. Here, the second resolution is greater than the first resolution. FIG. 4L illustrates example block 16 from the shaded texture atlas 404 as block 16 would be generated if the processing unit 106 did not perform mip-map biasing. The hashed lines with the border lines of the sub-blocks in FIG. 4L represent example primitives.

Using the mip-map biasing process 209, the processing unit 106 may be configured to shade the primitives of block 16 using a second resolution instead of the first resolution. In this example, the processing unit 106 is configured to split or otherwise divide the sub-blocks of block 16 into multiple blocks (i.e., blocks 16', 17, 18, and 19 shown in FIG. 4M) since the second resolution is greater than the first resolution. FIGS. 4N-Q respectively show the sub-blocks of blocks 16', 17, 18, and 19 of the mip-map biased shaded texture atlas 404'. As shown, the mip-map biased shaded texture atlas 404' has more pixels than the shaded texture atlas 404 that would have been generated. With more pixels, the bit rate of the content encoder 108 will be increased when encoding the mip-map biased shaded texture atlas 404' compared to the shaded texture atlas 404 had the latter been generated.

As described herein, to control the bit rate of the content encoder 108, the processing unit 106 may be configured to (1) perform adaptive shading frame rate, (2) perform mip-map biasing, and/or (3) provide one or more instructions to the content encoder 108 to set one or more coding parameters. FIG. 2C illustrates an example of one technique of combining these various techniques, shown as flow diagram 201. For example, FIG. 2C provides one example of how the processing unit 106 may be configured to perform the processes associated with blocks 204 and 211 in FIG. 2A. For example, blocks 232, 234, and 236 may be associated with block 207, blocks 240, 242, and 244 may be associated with block 209, and block 246 may be associated with block 211. However, the various techniques may be combined in other ways as well.

In the example of FIG. 2C, at block 230, the processing unit 106 may be configured to determine, for the current frame, which of the rate control techniques to use. In this context, frame refers to the frame that is to be rendered by the destination device 104 but the graphical content for the frame to be rendered by the destination device 104 is generated by the processing unit 106 of the source device 102.

At block 232, the processing unit 106 may be configured to determine whether adaptive shading is enabled. In some examples, adaptive shading frame rate may have a corresponding flag (which may be referred to as the adaptive shading frame rate flag) that may be a first value or a second value. The first value may be indicative that adaptive shading frame rate is enabled, and the second value may be indicative that adaptive shading frame rate is disabled. The value of the adaptive shading frame rate flag may depend on the available bit rate budget and/or the content of the scene associated with the current frame. In some examples, the available bit rate budget may refer to the maximum bit rate achievable by the content encoder 108 minus the current bit rate of the content encoder 108. In other examples, the available bit rate budget may refer to a maximum bit rate allowed by a coding standard minus the current bit rate of the content encoder 108. The processing unit 106 may set the flag based on the available bit rate budget. For example, if the available bit rate budget is below a threshold value, this means that adaptive shading frame rate could be used to reduce the bit rate of the content encoder 108.

If the processing unit 106 determines that adaptive shading frame rate is enabled for the current frame, then the processing unit 106 may be configured to determine whether to use adaptive shading frame rate for the current frame at block 234. For example, the processing unit 106 may be configured to determine whether to use adaptive shading frame rate for the current frame based on lighting and motion information corresponding to the current frame and a re-use counter indicative of how many times the shaded texture atlas or a portion of the shaded texture atlas previously generated by the processing unit 106 has been re-used. If this information indicates that the amount of shading drift (which may also be referred to as shading error) is acceptable, then the processing unit 106 may be configured to proceed to use adaptive shading frame rate for the current frame and proceed to block 236. At block 236, the processing unit 106 may be configured to re-use the previously generated shaded texture atlas or re-use a portion of the previously generated shaded texture atlas for the current frame and increment the re-use counter. After block 236, the processing unit 106 may proceed to block 238, where the processing unit 106 may be configured to repeat the processes set forth in the example of FIG. 2C for a subsequent frame. In some examples, each portion of a shaded texture atlas may have a respective re-use counter associated therewith.

If the lighting and motion information corresponding to the current frame and the re-use counter indicates that the amount of shading drift is not acceptable, then the processing unit 106 may be configured to proceed by not re-using a shaded texture atlas or by not re-using a portion of the shaded texture atlas for the current frame and proceed to block 240. Otherwise described, the processing unit 106 may be configured to generate a shaded texture atlas for the current frame in accordance with the techniques described herein. Similarly, if the processing unit 106 determines at block 232 that adaptive shading frame rate is disabled, then the processing unit 106 may proceed to block 240 to begin the process of generating a shaded texture atlas in accordance with the techniques described herein.

At block 240, the processing unit 106 may be configured to determine whether mip-map biasing is enabled. In some examples, mip-map biasing may have a corresponding flag (which may be referred to as the mip-map biasing flag) that may be a first value or a second value. The first value may be indicative that mip-map biasing is enabled, and the second value may be indicative that mip-map biasing is disabled. The value of the mip-map biasing flag may depend on the available bit rate budget and/or the content of the scene associated with the current frame. The processing unit 106 may set the flag based on the available bit rate budget. For example, if the available bit rate budget is below a threshold value, this means that mip-map biasing could be used to reduce the bit rate of the content encoder 108.

If the processing unit 106 determines that mip-map biasing is enabled for the current frame, then the processing unit 106 may be configured to determine whether to use mip-map biasing for the current frame at block 242. For example, the processing unit 106 may be configured to determine whether to use mip-map biasing for the current frame based on primitive flatness information corresponding to the current frame on a per block basis of the shaded texture atlas to be generated. For example, the processing unit 106 may be configured to determine the average flatness of each block in a shaded texture atlas to be generated for the current frame by adding the primitive flatness associated with each primitive in each block and dividing the sum by the total number of primitives in the block. If all blocks of a shaded texture atlas to be generated for the current frame have a flatness above a flatness threshold value (meaning that all blocks include primitives that are, on average, not flat, for example), then the processing unit 106 may be configured to not apply mip-map biasing and proceed to block 246. However, if at least one block of the shaded texture atlas to be generated has a flatness below the flatness threshold (meaning that the at least one block includes primitives that are, on average, flat, for example), then the processing unit 106 may be configured to apply mip-map biasing and proceed to block 244 to reduce the resolution used to generate the at least one block determine to be flat. In other examples, the processing unit 106 may be configured to use mip-map biasing for a block that is not flat by increasing the resolution, such as when the available bit rate budget would allow for it.

After block 244, the processing unit 106 may proceed to block 246. At block 246, the processing unit 106 may be configured to provide one or more instructions to the content encoder 108 and set the re-use counter to zero (or one or more re-use counters to zero depending on the example). In some examples, one or more instructions from the processing unit 106 may modify or adjust one or more coding parameters of the content encoder 108, such as a Quantization Parameter (QP). The QP may be adjusted based on the total number pixels in the shaded texture atlas and the available bit rate budget. After block 246, the processing unit 106 may proceed to block 238, where the processing unit 106 may be configured to repeat the processes set forth in the example of FIG. 2C for a subsequent frame.

Referring again to FIG. 2A, at block 210, the content encoder 108 may be configured encode graphical content generated by the processing unit 106 at block 204. In some examples, the graphical content generated by the processing unit 106 that the content encoder 108 is configured to encode includes the shaded texture atlas information 206. The content encoder 108 may be configured to encode the graphical content, such as the shaded texture atlas information 206, based on one or more instructions received from the processing unit 106. For example, the content encoder 108 may receive one or more instructions from the processing unit 106 that modify or adjust one or more coding parameters, such as a Quantization Parameter (QP)) of the content encoder 108.

In accordance with the techniques described herein, the content encoder 108 may be configured to encode shaded texture atlas information 206 to generate the encoded shaded texture atlas information 212. In some examples, the content encoder 108 may be configured to encoded the shaded texture atlas information in accordance with a content coding standard, such as a video coding standard. The content encoder 108 may be configured to encode shaded texture atlas information 206 as K frames, where K is an integer value. The frames input to the content encoder 108 may be referred to as input frames. In examples where the content encoder 108 is a video encoder, the K frames (which may be referred to as input frames) may be K video frames (which may be referred to as K video input frames). For example, the content encoder 108 may be configured to encode shaded texture atlas information 206 as K video frames.

One or more encoded frames may represent a single encoded shaded texture atlas. In some examples, each block of a shaded texture atlas may be encoded as a respective frame. In other examples, N blocks of a shaded texture atlas may be encoded as a frame (i.e., the N blocks constitute the frame that is encoded by the content encoder 108), where N is any integer value. In other examples, one or more blocks from one or more shaded texture atlases may be encoded as a frame.

Whether a frame includes a single block from a single shaded texture atlas or multiple blocks from one or more shaded texture atlases, the content encoder 108 may be configured to encode a frame as an independent frame or a dependent frame. An independent frame is encoded independently of any other frame and may be referred to as an intra-coded frame. A dependent frame is encoded based on at least one other frame and may be referred to as an inter-coded frame. For example, a dependent frame may be a Predicted-frame (P-frame) or a Bidirectional predicted frame (B-frame).

In some examples, the decision between encoding a block or a frame as an intra-coded frame or an inter-coded frame may be based on or more factors. The one or more factors may include the bit-rate budget of the content encoder 108 and network packet losses. For example, the content encoder 108 may be configured to periodically insert inter-coded frames to stop error propagation in the case of packet loss. In such an example, the processing unit 106 may be configured to adaptively enforce the content encoder 108 to code the next block or frame as an intra-coded frame in response to detected packet loss in a corresponding previous block or previous frame.

The content encoder 108 may be configured to output a bitstream with a bit rate controlled by the processing unit 106 (which may be a GPU) in accordance with the techniques described herein. The bitstream represents the encoded shaded texture atlas information 212. At block 214, the destination device 104 may be configured to transmit position information and encoded shaded texture atlas information to the destination device 104. For example, the destination device 104 may be configured to transmit position information 208 and encoded shaded texture atlas information 212 to the destination device 104. At block 216, the destination device 104 may receive such information. At block 218, the content decoder 122 may be configured to decode encoded shaded texture atlas information, such as encoded shaded texture atlas information 212, to generate decoded shaded texture atlas information. The decoded shaded texture atlas information may be with or without loss compared to the shaded texture atlas information from which the encoded shaded texture atlas information was generated.

At block 220, the processing unit 120 may be configured to render one or more frames based on the position information that the destination device 104 received from the source device 102 and the decoded shaded texture atlas information generated by the content decoder 122 as described herein. The processing unit 120 may be configured to perform graphics processing pipeline 107-2 to generate one or more frames for display using graphical content received from the source device 102 (e.g., position information and encoded shaded texture atlas information).

For example, the decoded shaded texture atlas information may include a shaded texture atlas. The processing unit 120 may, based on first position information received from the destination device 104, render a first frame using the shaded texture atlas that was derived by decoding encoded information. The processing unit 120 may, based on second position information received from the destination device 104, render a second frame using the same shaded texture atlas. This is an example where the shaded texture atlas for the second frame was not generated. Instead, the shaded texture atlas associated with the first frame was re-used to render the second frame.

At block 222, the destination device 104 may be configured to present one or more frames rendered by the processing unit 120 on the display 131 with or without processing by a display processor, such as display processor 127. For example, in accordance with the techniques described herein, the processing unit 120 of the destination device 104 may be configured to use the graphical content generated by the processing unit 106 to render one or more frames, which may be output to a frame buffer, which may be located in the system memory 124. The display processor 127 may be configured to read frames from the frame buffer, perform display processing on the frames, and provide the processed frames to the display 131 for presentment thereon.

Figure 5:
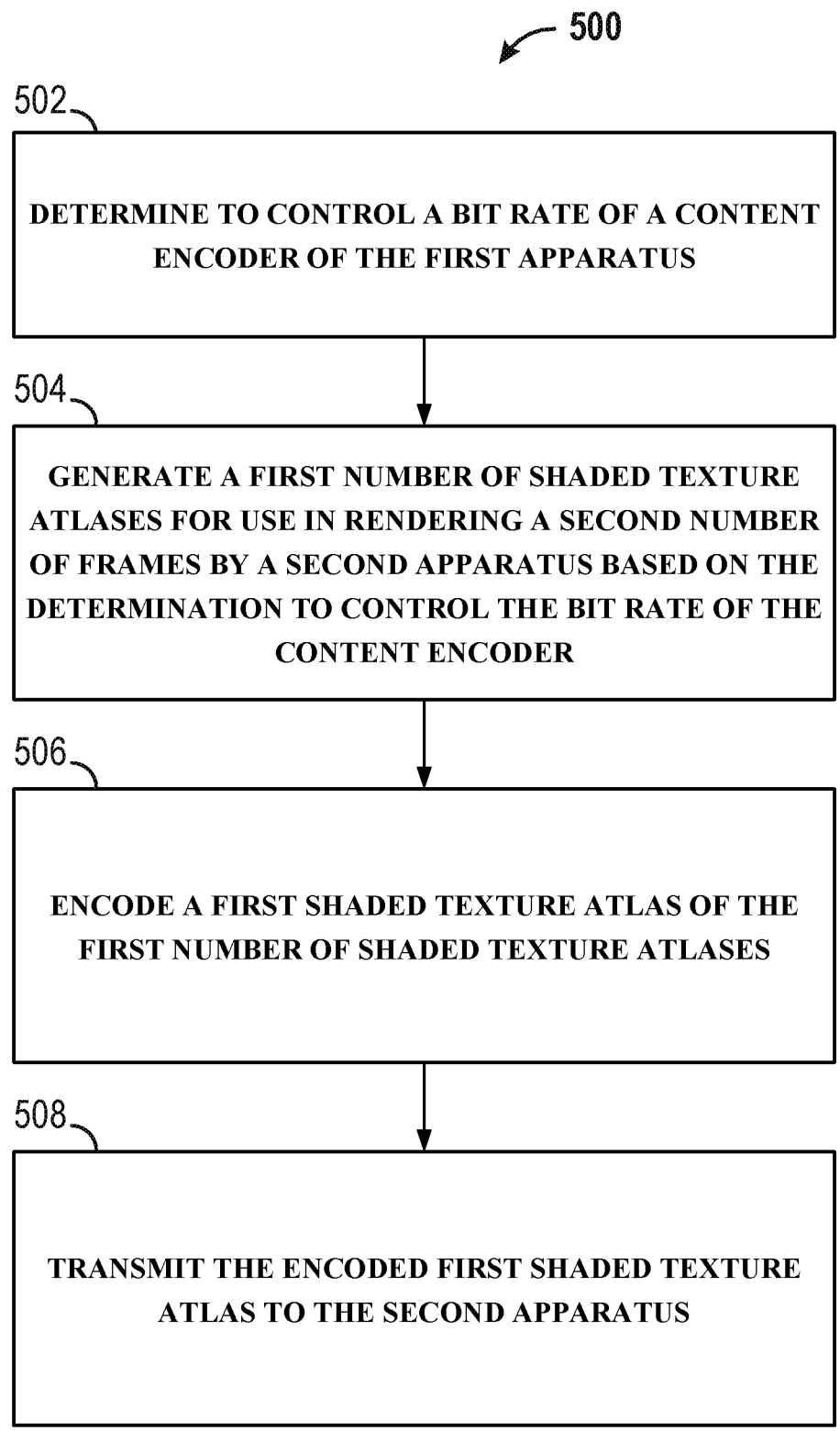
FIG. 5 illustrates an example flowchart of a method of content generation and coding in accordance with one or more techniques of this disclosure.

FIG. 5 illustrates an example flowchart 500 of a method of content generation and coding in accordance with one or more techniques of this disclosure. The method may be performed by one or more components of a first apparatus. The first apparatus may be the source device 102. In some examples, the method illustrated in flowchart 500 may include one or more functions described herein that are not illustrated in FIG. 5, and/or may exclude one or more illustrated functions.

At block 502, a first processing unit of the first apparatus may be configured to determine to control a bit rate of a content encoder of the first apparatus. At block 504, the first processing unit of the first apparatus may be configured to generate a first number of shaded texture atlases for use in rendering a second number of frames by a second apparatus based on the determination to control the bit rate of the content encoder. The second apparatus may be the destination device 104. Each respective shaded texture atlas may include a respective plurality of shaded primitives. In some examples, the first number is less than the second number. In some examples, at least one shaded texture atlas of the first number of shaded texture atlases corresponds to more than one frame of the second number of frames. The at least one shaded texture atlas may include the first shaded texture atlas. In some examples, to generate the first number of shaded texture atlases for use in rendering the second number of frames by the second device, the first processing unit may be configured to generate the first shaded texture atlas for use in rendering at least two frames of the second number frames by the second device.

In some examples, to generate the first number of shaded texture atlases for use in rendering the second number of frames by the second device, the first processing unit may be configured to generate the first shaded texture atlas for use in rendering a first frame of the first number of frames. In some examples, to determine to control the bit rate of the content encoder, the first processing unit may be configured to determine that the first shaded texture atlas is to be re-used by the second device for rendering a second frame of the first number of frames or that the first shaded texture atlas is not to be re-used by the second device for rendering the second frame of the first number of frames. In such examples, the first processing unit may be configured to refrain from generating, based upon the determination that the first shaded texture atlas is to be re-used by the second device for rendering the second frame, a second shaded texture atlas for use by the second device in rendering the second frame. In such examples, the first processing unit may be configured to generate, based upon the determination that the first shaded texture atlas is not to be re-used by the second device for rendering the second frame of the first number of frames, a second shaded texture atlas for use by the second device in rendering the second frame.

In some examples, to determine that the first shaded texture atlas is to be re-used by the second device for rendering the second frame of the first number of frames, the first processing unit may be configured to determine a number of times the first shaded texture atlas has been re-used by the second device for rendering one or more frames different from the second frame. The one or more frames different from the second frame may include the first frame. The first processing unit may be configured to determine that the first shaded texture atlas is to be re-used by the second device for rendering the second frame of the first number of frames only when the number of times the first shaded texture atlas has been re-used by the second device for rendering one or more frames is less than a threshold value.

In some examples, to determine to control the bit rate of the content encoder, the first processing unit may be configured to perform at least one of: determine to perform adaptive shading frame rate to control the bit rate of the content encoder, where to generate the first number of shaded texture atlases, the first processing unit may be configured to generate at least one shaded texture atlas by performing adaptive shading frame rate based on the determination to perform adaptive shading frame rate; or determine to perform mip-map biasing to control the bit rate of the content encoder, where to generate the first number of shaded texture atlases, the first processing unit may be configured to generate at least one shaded texture atlas by performing mip-map biasing based on the determination to perform mip-map biasing.

In some examples, to generate the first number of shaded texture atlases for use in rendering the second number of frames, the first processing unit may be configured to generate the first shaded texture atlas. The first shaded texture atlas may include a plurality of blocks. Each block may include a plurality of primitives. The plurality of blocks may include a first block. To generate the first shaded texture atlas, the first processing unit may be configured to: reduce a first number of pixels used to represent the primitives in the first block to a second number of pixels, and generate the first block with primitives using the second number of pixels instead of the first number of pixels. The second number of pixels may be less than the first number of pixels. In some examples, the first number of pixels corresponds to a first resolution and the second number of pixels corresponds to a second resolution. The second resolution may be smaller than the first resolution. In some examples, the first block includes a plurality of sub-blocks. Each sub-block may include a respective subset of the plurality of primitives included in the first block.

In some examples, the first processing unit may be configured to provide one or more instructions to the content encoder to adjust one or more coding parameters of the content encoder. In such examples, to encode the first shaded texture atlas of the first number of shaded texture atlases, the content encoder may be configured to encode the first shaded texture atlas of the first number of shaded texture atlases based on the one or more instructions received from the processing unit of the first device.

At block 506, the content encoder of the first apparatus may be configured to encode a first shaded texture atlas of the first number of shaded texture atlases. At block 508, the first apparatus may be configured to transmit the encoded first shaded texture atlas to the second apparatus.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a processing unit of a first device, to control a bit rate of a content encoder of the first device;
   generating, by the processing unit of a first device, a first number of shaded texture atlases for use in rendering a second number of frames by a second device based on the determination to control the bit rate of the content encoder, wherein each respective shaded texture atlas includes a respective plurality of shaded primitives, the first number of shaded texture atlases including a first shaded texture atlas, wherein the first shaded texture atlas includes a plurality of blocks, wherein each block includes a plurality of primitives, wherein the plurality of blocks includes a first block;
   encoding, by the content encoder of the first device, the first shaded texture atlas of the first number of shaded texture atlases; and
   transmitting, by the first device, the encoded first shaded texture atlas to the second device.

2. The method of claim 1, wherein the first number is the same as the second number.

3. The method of claim 1, wherein determining to control the bit rate of the content encoder comprises:
   determining to perform adaptive shading frame rate to control the bit rate of the content encoder, wherein generating the first number of shaded texture atlases includes generating at least one shaded texture atlas by performing adaptive shading based on the determination to perform adaptive shading.

4. The method of claim 1, wherein determining to control the bit rate of the content encoder comprises:
   determining to perform mip-map biasing to control the bit rate of the content encoder, wherein generating the first number of shaded texture atlases includes generating at least one shaded texture atlas by performing mip-map biasing based on the determination to perform mip-map biasing.

5. The method of claim 1, wherein generating the first shaded texture atlas comprises:
   reducing a first number of pixels used to represent the primitives in the first block to a second number of pixels, wherein the second number of pixels is less than the first number of pixels; and
   generating the first block with primitives using the second number of pixels instead of the first number of pixels.

6. The method of claim 5, wherein the first number of pixels corresponds to a first resolution and the second number of pixels corresponds to a second resolution, wherein the second resolution is smaller than the first resolution.

7. The method of claim 5, wherein the first block includes a plurality of sub-blocks, wherein each sub-block includes a respective subset of the plurality of primitives included in the first block.

8. The method of claim 1, further comprising:
   providing, by the processing unit of the first device, one or more instructions to the content encoder to adjust one or more coding parameters of the content encoder.

9. The method of claim 8, wherein encoding the first shaded texture atlas of the first number of shaded texture atlases comprises encoding the first shaded texture atlas of the first number of shaded texture atlases based on the one or more instructions received from the processing unit of the first device.

10. A first device comprising:
    a memory configured to store data;
    a first processing unit communicatively coupled with the memory; and
    a content encoder communicatively coupled with the memory and with the first processing unit,
    wherein the first processing unit is configured to determine to control a bit rate of the content encoder and generate a first number of shaded texture atlases for use in rendering a second number of frames by a second device based on the determination to control the bit rate of the content encoder and a first shaded texture atlas, wherein the first shaded texture atlas includes a plurality of blocks, wherein each block includes a plurality of primitives, wherein the plurality of blocks includes a first block, wherein each respective shaded texture atlas includes a respective plurality of shaded primitives,
    wherein the content encoder is configured to encode the first shaded texture atlas of the first number of shaded texture atlases, and
    wherein the first device is configured to transmit the encoded first shaded texture atlas to the second device.

11. The first device of claim 10, wherein the first number is the same as the second number.

12. The first device of claim 10, wherein to determine to control the bit rate of the content encoder, the first processing unit is configured to:
determine to perform adaptive shading to control the bit rate of the content encoder, wherein to generate the first number of shaded texture atlases, the first processing unit is configured to generate at least one shaded texture atlas by performing adaptive shading based on the determination to perform adaptive shading.

13. The first device of claim 10, wherein to determine to control the bit rate of the content encoder, the first processing unit is configured to:
determine to perform mip-map biasing to control the bit rate of the content encoder, wherein to generate the first number of shaded texture atlases, the first processing unit is configured to generate at least one shaded texture atlas by performing mip-map biasing based on the determination to perform mip-map biasing.

14. The first device of claim 10, wherein each block includes a plurality of primitives, wherein the plurality of blocks includes a first block, and wherein to generate the first shaded texture atlas, the first processing unit is configured to:
reduce a first number of pixels used to represent the primitives in the first block to a second number of pixels, wherein the second number of pixels is less than the first number of pixels; and
generate the first block with primitives using the second number of pixels instead of the first number of pixels.

15. The first device of claim 14, wherein the first number of pixels corresponds to a first resolution and the second number of pixels corresponds to a second resolution, wherein the second resolution is smaller than the first resolution.

16. The first device of claim 14, wherein the first block includes a plurality of sub-blocks, wherein each sub-block includes a respective subset of the plurality of primitives included in the first block.

17. The first device of claim 10, wherein the first processing unit is further configured to:
provide one or more instructions to the content encoder to adjust one or more coding parameters of the content encoder.

18. The first device of claim 17, wherein to encode the first shaded texture atlas of the first number of shaded texture atlases, the content encoder is configured to encode the first shaded texture atlas of the first number of shaded texture atlases based on the one or more instructions received from the processing unit of the first device.

19. A device comprising:
a receiver configured to receive an encoded first shaded texture atlas, wherein the first shaded texture atlas of a first number of shaded texture atlases is encoded by a content encoder of a first device;
a content decoder communicatively coupled with the receiver, wherein the content decoder is configured to decode the first shaded texture atlas of the first number of shaded texture atlases, wherein the first shaded texture atlas is configured for use in rendering a number of frames based on a controlled bit rate of a content encoder; and
a processing unit communicatively coupled with the receiver and the content decoder, wherein the processing unit is configured to render a number of frames based on the first shaded texture atlas, wherein the first shaded texture atlas includes a plurality of blocks, wherein each block includes a plurality of primitives, wherein the plurality of blocks includes a first block, wherein each respective shaded texture atlas includes a respective plurality of shaded primitives.

20. The device of claim 19, wherein the bit rate is controlled by at least one of:
the first number of shaded texture atlases includes at least one shaded texture atlas generated with adaptive shading based; or
the first number of shaded texture atlases includes at least one shaded texture atlas generated with mip-map biasing.

* * * * *